(12) United States Patent
Chen et al.

(10) Patent No.: US 8,395,853 B2
(45) Date of Patent: Mar. 12, 2013

(54) IMAGE PICK-UP OPTICAL SYSTEM

(75) Inventors: Chun-Shan Chen, Taichung (TW);
Ming-Ta Chou, Taichung (TW);
Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 87 days.

(21) Appl. No.: 13/210,028

(22) Filed: Aug. 15, 2011

(65) Prior Publication Data

US 2012/0229918 A1    Sep. 13, 2012

(30) Foreign Application Priority Data

Mar. 9, 2011  (TW) .............................. 100107863 A

(51) Int. Cl.
*G02B 3/02*   (2006.01)
(52) U.S. Cl. ........................................ 359/714; 359/708
(58) Field of Classification Search .................. 359/642, 359/708, 714–715
See application file for complete search history.

(56) References Cited

U.S. PATENT DOCUMENTS

| | | | |
|---|---|---|---|
| 6,940,662 B2 | 9/2005 | Sekita | |
| 6,985,309 B2 | 1/2006 | Shinohara | |
| 7,663,813 B2 | 2/2010 | Lai | |
| 7,710,665 B2 | 5/2010 | Park et al. | |
| 7,826,151 B2 | 11/2010 | Tsai | |
| 7,830,620 B2* | 11/2010 | Asami | 359/761 |
| 2009/0009887 A1* | 1/2009 | Chen et al. | 359/753 |
| 2010/0085651 A1* | 4/2010 | Asami | 359/752 |
| 2010/0253829 A1 | 10/2010 | Shinohara | |
| 2010/0254029 A1 | 10/2010 | Shinohara | |

* cited by examiner

*Primary Examiner* — James Greece
(74) *Attorney, Agent, or Firm* — Wang Law Firm, Inc.; Li K. Wang; Stephen Hsu

(57) ABSTRACT

An image pick-up optical system, in order from an object side to an image side, along an optical axis comprising: the first lens element with negative refractive power having a convex object-side surface and a concave image-side surface, the second lens element with positive refractive power, a bi-convex third lens element with positive refractive power, the fourth lens element with negative refractive power having a concave object-side surface, a plastic fifth lens element with positive refractive power having a convex object-side surface and at least one aspherical optical surface. Additionally, the image pick-up optical system satisfies conditions related to shorten the total length and to enhance the ability of wider field of view for use in compact cameras and mobile phones.

18 Claims, 18 Drawing Sheets

IMAGE PICK-UP OPTICAL SYSTEM

BACKGROUND OF THE INVENTION

1. Field of the Invention

The present invention relates to an image pick-up optical system, and more particularly to an image pick-up optical system comprising five lens elements and providing an optical lens assembly with a large field angle, a short total length, and a low cost, and the optical system is applied to an electronic product.

2. Description of the Related Art

As science and technology advance, optical systems for electronic products such as digital still cameras, web cameras or mobile phones tend to be developed with a compact design and a low cost, while meeting user requirements for an optical lens assembly with large field angle, good aberration correction ability, high resolution, and high image quality.

In general, a conventional image pick-up optical system of a compact electronic product comes with different designs, including the two-lens, three-lens, four-lens, and five-or-more lens designs. If the image quality is taken into consideration, the optical lens assemblies with the four-lens and five-lens designs have advantages on aberration correction and modulation transfer function (MTF) performance, and the five-lens design having a higher resolution than the four-lens design is applicable for electronic products of high video quality or high pixel requirement.

In the products such as the mini digital cameras, web cameras, and mobile phone cameras, a compact optical lens assembly with a short focal length and a good aberration is required. In various five-lens designs, an image pickup optical lens assembly with a fixed focal length and different combinations of positive and negative refractive powers are adopted. As disclosed in U.S. Pat. No. 7,710,665, a good aberration correction can be achieved, but the total length of the optical system is still difficult to meet the requirements of a mini electronic device. As disclosed in U.S. patents and publications of U.S. Pat. No. 7,826,151, US2010/0254029 and US2010/0253829, optical systems are designed with a shorter total length by adopting a first lens element with negative refractive power, a second lens element or a third lens element with positive refractive power which is generally called out-phase imaging to obtain a wider field angle. However, the first lens element with the negative refractive power will cause a too-large refractive angle of the light exiting the first lens element and result in an easy light dispersion and a difficult aberration correction of following lenses.

U.S. Pat. No. 7,663,813, U.S. Pat. No. 6,985,309 and U.S. Pat. No. 6,940,662 disclose a first lens element with negative refractive power, and a third lens element and a fourth lens element cemented into a cemented lens to increase the thickness of the lens, so as to reduce the chromatic aberration and the coma aberration produced by the lens assemblies effectively. However, these patents come with in appropriate refractive power of the fifth lens element, and the aberration or distortion of the image is increased. For optical lens assemblies used in mini electronic products, it is necessary to have a more practical design capable of reducing the optical lens assembly, while using the refractive power of the five lens elements, a combination of concave and convex optical surfaces, and the first lens element with positive or negative refractive powers to capture the maximum light of the image, and minimize the air gap between lenses or even form a cemented lens. In addition, the refractive powers of the lenses and the aberration correction ability are adjusted to shorten the total length of the optical lens assembly effectively, so as to improve the image quality, simplifying the manufacture, and apply the optical lens assembly to mini electronic products.

SUMMARY OF THE INVENTION

The primary objective of the present invention is to provide an image pick-up optical system comprising: a first lens element, a second lens element, a third lens element, a fourth lens element and a fifth lens element, sequentially arranged from an object side to an image side along an optical axis, wherein first lens element with negative refractive power has a convex object-side surface and a concave image-side surface; the second lens element comes with positive refractive power; the third lens element with positive refractive power has a convex object-side surface and a convex image-side surface; the fourth lens element with negative refractive power has a concave object-side surface; the fifth lens element with positive refractive power, is made of plastic, and has a convex object-side surface, and at least one of the object-side surface an image-side surface being aspheric; the image pick-up optical system of the present invention further comprises a stop; and the image pick-up optical system satisfies the following conditions:

$$0.8 < f_2/f_5 < 1.6 \tag{1}$$

$$1.2 < R_1/R_2 < 5.0 \tag{2}$$

$$0 < D_{SR3}/T_{12} < 0.4 \tag{3}$$

where, $f_2$ is a focal length of the second lens element, $f_5$ is a focal length of the fifth lens element, $R_1$ is a radius of curvature of the object-side surface of the first lens element, $R_2$ is a radius of curvature of the image-side surface of the first lens element, $D_{SR3}$ is an axial distance from the stop to the object-side surface of the second lens element, $T_{12}$ is an axial distance between the first lens element and the second lens element.

The image pick-up optical system satisfies the following condition further satisfies the following condition:

$$23.0 < v_3 - v_4 < 38.0 \tag{4}$$

where, $v_3$ is the Abbe number of the third lens element, and $v_4$ is the Abbe number of the fourth lens element.

The present invention further provides an image pick-up optical system, comprising: a first lens element, a second lens element, a third lens element, a fourth lens element and a fifth lens element sequentially arranged from an object side to an image side along an optical axis, wherein the fourth lens element has a concave image-side surface; and the image pick-up optical system may further comprise an image sensor installed on the image plane for imaging an object and satisfies the one or more of the following conditions in addition to the conditions of (1), (2) and (3):

$$-1.1 < R_7/R_8 < 0.0 \tag{5}$$

$$TTL/ImgH < 6.0 \tag{6}$$

where, $R_7$ is a radius of curvature of the object-side surface of the fourth lens element, $R_8$ is a radius of curvature of the image-side surface of the fourth lens element, TTL is an axial distance from on the object-side surface of the first lens element to the image plane, and ImgH is a half of the diagonal length of the effective photosensitive area of the image sensor.

Another objective of the present invention is to provide an image pick-up optical system comprising: a first lens element, a second lens element, a third lens element, a fourth lens element and a fifth lens element sequentially arranged from an object side to an image side along an optical axis, wherein the first lens element with negative refractive power has a convex object-side surface and a concave image-side surface; the second lens element with positive refractive power has a convex image-side surface; the third lens element with positive refractive power has a convex object-side surface and a convex image-side surface; the fourth lens element with negative refractive power has a concave object-side surface and a concave image-side surface; the fifth lens element with positive refractive power is made of plastic and has a convex object-side surface, at least one of the object-side surface and an image-side surface thereof being aspheric; and the image pick-up optical system of the present invention may further comprise a stop. For different applications, the image pick-up optical system of the present invention satisfies the one or more of the following conditions in addition to the conditions of (1), (2) and (3):

$$0 < D_{SR3}/T_{12} < 0.3 \tag{7}$$

$$-1.8 < f/f_4 < -0.8 \tag{8}$$

$$|R_9/R_{10}| < 0.3, \tag{9}$$

$$0 < T_{23}/f < 0.3 \tag{10}$$

$$0 < D_{SR3}/T_{12} < 0.2 \tag{11}$$

$$1.6 < R_1/R_2 < 3.5; \tag{12}$$

where, $D_{SR3}$ is an axial distance from the stop to the object-side surface of the second lens element, $T_{12}$ is an axial distance between the first lens element and the second lens element, $T_{23}$ is the axial distance between the second lens element and the third lens element, f is a focal length of the image pick-up optical system, $f_4$ is a focal length of the fourth lens element, $R_1$ is a radius of curvature of the object-side surface of the first lens element, $R_2$ is a radius of curvature of the image-side surface of the first lens element, $R_9$ is a radius of curvature of the object-side surface of the fifth lens element, and $R_{10}$ is a radius of curvature of the image-side surface of the fifth lens element.

The present invention further provides an image pick-up optical system comprising: a first lens element, a second lens element, a third lens element, a fourth lens element and a fifth lens element, sequentially arranged from an object side to an image side along an optical axis, wherein the second lens element has a convex image-side surface; the fourth lens element has a concave image-side surface; the third lens element is made of glass, or the third lens element and the fourth lens element are connected as one doublet lens element. The image pick-up optical system satisfies the conditions of (1), (2), (3) and (7).

The present invention provides an image pick-up optical system comprising: a first lens element, a second lens element, a third lens element, a fourth lens element and a fifth lens element sequentially arranged from an object side to an image side along an optical axis, wherein the first lens element with negative refractive power has a convex object-side surface and a concave image-side surface; the second lens element with positive refractive power has a convex image-side surface; the third lens element with positive refractive power has a convex object-side surface and a convex image-side surface; the fourth lens element with negative refractive power has a concave object-side surface and a concave image-side surface; the fifth lens element with positive refractive power is made of plastic and has a convex object-side surface, and at least one of the object-side surface and an image-side surface thereof being aspheric; and the image pick-up optical system of the present invention may further comprise a stop. For different applications, the image pick-up optical system of the present invention satisfies the one or more of the following conditions in addition to the conditions of (1), (2) and (3):

$$0 < D_{SR3}/T_{12} < 0.3 \tag{7}$$

$$-0.8 < f/f_3 < -1.8 \tag{13}$$

$$|(R_5+R_6)/(R_5-R_6)| < 0.5 \tag{14}$$

$$0 < CT_1/T_{12} < 0.75 \tag{15}$$

$$|R_4/R_3| < 0.6 \tag{16}$$

where, $D_{SR3}$ is an axial distance from the stop to the object-side surface of the second lens element, $T_{12}$ is an axial distance between the first lens element and the second lens element, $CT_1$ is a central thickness of the first lens element, f is a focal length of the image pick-up optical system, $f_3$ is a focal length of the third lens element, $R_3$ is a radius of curvature of the object-side surface of the second lens element, $R_4$ is a radius of curvature of the image-side surface of the second lens element, $R_5$ is a radius of curvature of the object-side surface of the third lens element, $R_6$ is a radius of curvature of the image-side surface of the third lens element.

In the present invention, the first lens element, the second lens element, the third lens element, the fourth lens element and the fifth lens element are installed with an appropriate interval apart on the optical axis to obtain good aberration correction and modulation transfer function (MTF) performance and shorten the total length of the optical lens assembly in order to apply increase the optical lens system to a mini electronic device.

In the image pick-up optical system of the present invention, the first lens element with negative refractive power, the second lens element with positive refractive power, and the third lens element with positive refractive power are adopted to provide a wider field angle for out-phase imaging. To overcome the problems of an easy light dispersion and a difficult aberration correction at following lenses, since the first lens element with negative refractive power may cause a too-large refractive angle of the light entering into the second lens element, the present invention shortens the distance between the second lens element with positive refractive power and the third lens element with positive refractive power or even cements the third lens element and the fourth lens element into a cemented lens, so as to reduce the chromatic aberration and coma aberration produced in the image pick-up optical system effectively. In addition, the fourth lens element with negative refractive power and the fifth lens element with positive refractive power are used for correcting the aberration and adjusting the modulation transfer function (MTF) to enhance the overall resolution of the image pick-up optical system, such that the overall aberration and distortion of the image pick-up optical system can meet the high-resolution requirement.

In addition, the pick-up optical system of the present invention image includes the stop which is a middle stop formed between the first lens element and the second lens element and provided for improving the front stop (which is the stop formed between an imaged object and the first lens element), such that the exit pupil of the image pick-up optical system will not be too far away from the image plane, and the light is adjusted and incident to the image sensor with a substantially perpendicular incident angle to provide a telecentric effect, and a balance between the telecentric effect and a wider field angle can be achieved. By the installation of the more powerful fourth lens element with negative refractive power and the weaker fifth lens element with positive refractive power, the wide-angle optical lens system can provide good corrections to the distortion and chromatic aberration.

DETAILED DESCRIPTION OF THE PREFERRED EMBODIMENTS

Figure 1A:
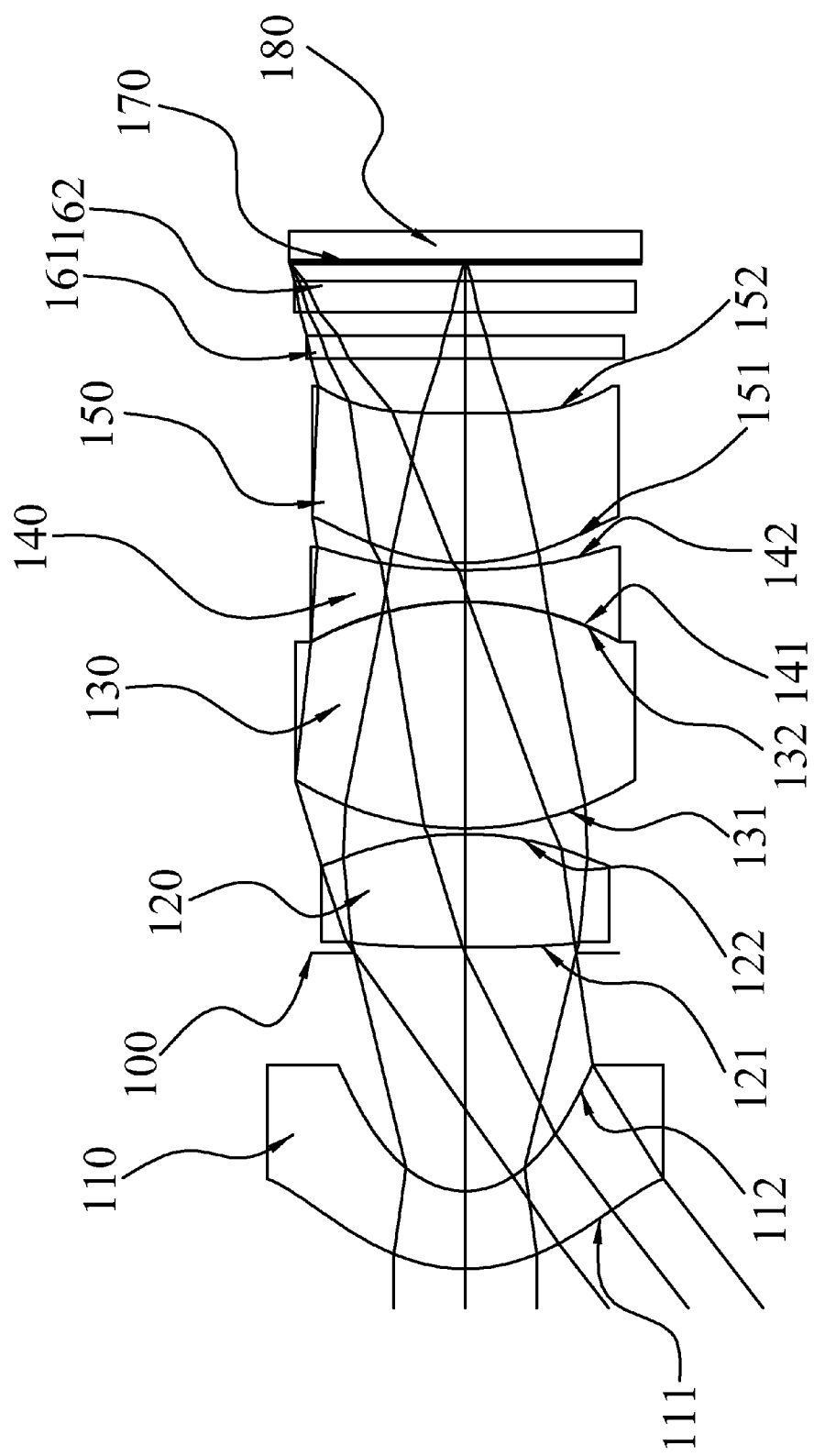
FIG. 1A is a schematic view of an optical system in accordance with the first preferred embodiment of the present invention.

With reference to FIG. 1A for an image pick-up optical system of the present invention, the image pick-up optical system comprises a first lens element (110), a second lens element (120), a third lens element (130), a fourth lens element (140) and a fifth lens element (150) sequentially arranged from an object side to an image side along an optical axis, wherein the first lens element (110) with negative refractive power has a convex object-side surface (111) and a concave image-side surface (112) in proximity to the optical axis, and both object-side surface (111) and image-side surface (112) being aspheric or spheric; the second lens element (120) with positive refractive power and has an object-side surface (121) and an image-side surface (122) being aspheric or spheric; the third lens element (130) with positive refractive power has a convex object-side surface (131) and a convex image-side surface (132) in proximity to the optical axis, and both object-side surface (131) and image-side surface (132) being aspheric or spheric; the fourth lens element (140) with negative refractive power has a concave object-side surface (141) and a concave image-side surface (142) in proximity to the optical axis, and both object-side surface (141) and image-side surface (142) being aspheric or spheric; the fifth lens element (150) with positive refractive power has a convex object-side surface (151) and a concave image-side surface (152) in proximity to the optical axis, and at least one of the object-side surface (151) and the image-side surface (152) being aspheric; the third lens element (130) and the fourth lens element (140) are cemented into a cemented lens; the image pick-up optical system can further comprise a stop, such as an aperture stop (100), an IR-filter (161) and a cover-glass (162), and the aperture stop (100) is formed between first lens element (110) and the second lens element (120); the IR-filter (161) and the cover-glass (162) are installed sequentially from the object side to the image side between the fifth lens element (150) and the image plane (170) and generally made of panel optical material which does not affect the focal length of the image pick-up optical system of the present invention; the image pick-up optical system can further comprise an image sensor (180) installed on the image plane (170) for imaging an object to be photographed. If the first lens element (110), second lens element (120), third lens element (130), fourth lens element (140) and fifth lens element (150) are aspheric surfaces, they satisfy the aspherical surface formula as given in Equation (17) below:

$$X(Y) = \frac{(Y^2/R)}{1+\sqrt{(1-(1+K)(Y/R)^2)}} + \sum_i (A_i) \cdot (Y^i) \quad (17)$$

where, X is the relative distance from a point on the aspherical surface with a distance Y from the optical axis to a tangent plane perpendicular to the optical axis on the aspherical surface;

Y is the height between a point on the curve of the aspherical surface and the optical axis;

K is the conic coefficient; and $A_i$ is the $i^{th}$ level aspherical surface coefficient.

With the aforementioned installation of the first lens element (110), the second lens element (120), the third lens element (130), the fourth lens element (140), the fifth lens element (150), the aperture stop (100) and the image sensor (180), the image pick-up optical system of the present invention satisfies the conditions of (1), (2) and (3).

If the ratio of the focal length $f_2$ of the second lens element (120) and focal length $f_5$ of the fifth lens element (150) is limited to the condition of $0.8<f_2/f_5<1.6$, and $f_2/f_5$ is greater than 1.6, or the focal length $f_5$ of the fifth lens element (150) is reduced to decrease the positive refractive power of the fifth lens element (150) and increase the back focal length, the total length of the optical system will be unfavorable for the mini design, and if $f_2/f_5$ is smaller than 0.8, then the second lens element (120) has insufficient positive refractive power and a weaker light collection ability.

The negative refractive power of the image pick-up optical system of the present invention mainly comes from the first lens element (110), such that the radius of curvature $R_1$ of the object-side surface (111) of the first lens element and the radius of curvature $R_2$ of the image-side surface (112) of the first lens element satisfy the condition of $1.2<R_1/R_2<5.0$, preferably $1.6<R_1/R_2<3.5$, an appropriate balance between the telecentric property and the wide angle property can be achieved, or the condition. Similarly, if the fourth lens element (140) with negative refractive power satisfies the condition of $-1.1<R_7/R_8<0.0$, then the aberration correction ability of the fourth lens element (140) with negative refractive power can be adjusted; if the second lens element (120) with positive refractive power satisfies the condition of $|R_4/R_3|<0.6$, then the positive refractive power of the second lens element (120) can be controlled to a level not too strong, and if the condition of $|R_9/R_{10}|<0.3$ is satisfied, then the positive refractive power of the fifth lens element (150) can be controlled to a level not too strong, so as to avoid dispersions of stray lights and correct the produced astigmatic field curving and prevent a low resolution effectively.

If the distance $D_{SR3}$ is decreased (or $D_{SR3}/T_{12}<0.4$, or the aperture stop (100) is close to the object-side surface (121) of the second lens element), the image receiving point of the first lens element (110) is positioned as close as possible to the object-side surface (121) of the second lens element, and the aperture stop (100) is formed at a position of the first lens element (110) with balanced refractive power, the image pick-up optical system can be reduced, and the light of the object to be photographed can be incident into the second lens element (120) perpendicularly, or the condition of $0<D_{SR3}/T_{12}<0.3$, preferably the condition of $0<D_{SR3}/T_{12}<0.2$ is limited to restrict the refractive angle of the light passing through the aperture stop (100) and air gap to enter into the second lens element (120) within a specific range to increase the refractive angle and decrease the total length.

If the condition of $23.0<v_3-v_4<38.0$ is satisfied, the difference between the Abbe number $v_3$ of the third lens element (130) and the Abbe number $v_4$ of the fourth lens element (140) will not be too small, so that the chromatic aberration produced by the third lens element (130) and the fourth lens element (140) can be corrected effectively to improve the chromatic aberration compensation ability of the fourth lens element (140).

If the condition of TTL/ImgH<6.0 is satisfied, the total length (TTL) of the image pick-up optical system can be shortened effectively, such that a larger effective pixel range (ImgH) of the image sensor can be achieved within the same total length (TTL).

If the condition of $-1.8<f/f_4<-0.8$ or $0.8<f/f_3<1.8$ is satisfied, a balance between the total focal length f, the focal length f4 of the fourth lens element (140) and the focal length f3 of the third lens element (130) to allocate the refractive power required by the fourth lens element (140) and the third lens element of the image pick-up optical system effectively to enhance the sensitivity of the image pick-up optical system.

If the condition of $0<T_{23}/f<0.3$ is satisfied, the distance $T_{23}$ between the image-side surface of the second lens element (122) and the object-side surface of the third lens element (131) can be reduced per unit length of the focal length f of the image pick-up optical system, so as to reduce the total length of the image pick-up optical system. Similarly, if the condition $0<CT_1/T_{12}<0.75$ is satisfied, the thickness of the first lens element (110) will not be too thick, or the distance $T_{12}$ between the image-side surface of the first lens element (112) and the object-side surface of the second lens element (121) is increased as much as possible, image pick-up optical system, such that the first lens element (110) has sufficient distance to collect maximum light (with the widest field angle) onto the object-side surface of the second lens element (121).

In the image pick-up optical system of the present invention, if the third lens element (130) satisfies the condition of $|(R_5+R_6)/(R_5-R_6)|<0.5$, the positive refractive power of the third lens element (130) will not be too strong, so that the incident angle of projecting the light into the image sensor will not be too high, and the light can enter into the image sensor more easily. If the condition $|(R_5+R_6)/(R_5-R_6)|<0.5$ is satisfied, then the positive refractive power of the third lens element (130) is increased to decrease the incident angle of the light entering into the image sensor, so that the curved surface shape of the fifth lens element (150) is too large, or the off-axis aberration of the image pick-up optical system is increased, which is unfavorable for achieving a good aberration compensation.

The image pick-up optical system of the present invention is described by means of preferred embodiments with relevant drawings as follows.

First Preferred Embodiment

Figure 1B:
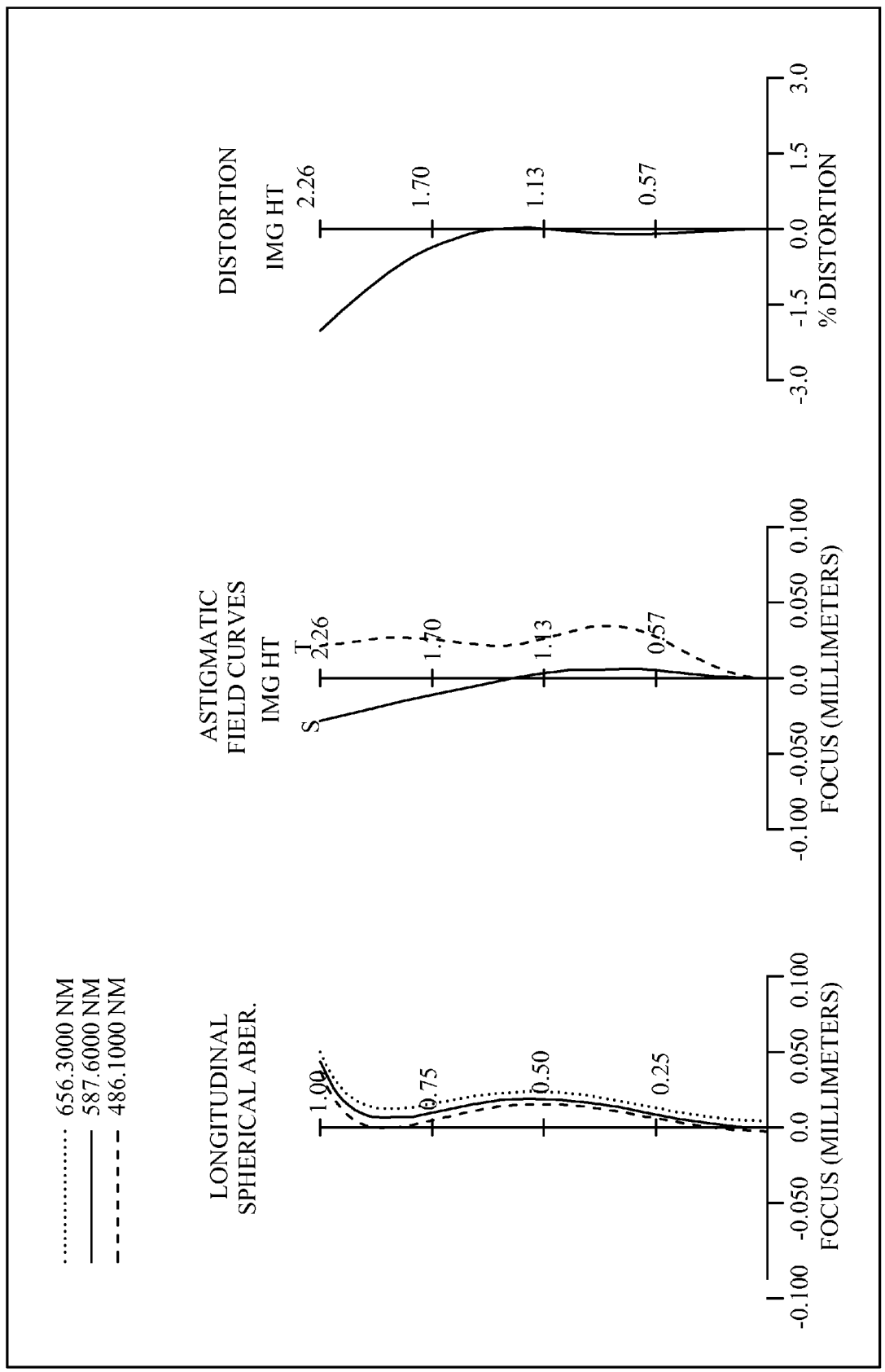
FIG. 1B is a series of aberration curves of the first preferred embodiment of the present invention.

With reference to FIGS. 1A and 1B for a schematic view and a series of aberration curves of an image pick-up optical system in accordance with the first preferred embodiment of the present invention respectively, the image pick-up optical system comprises five lens elements, an IR-filter (161), a cover-glass (162), an aperture stop (100) and an image sensor (180). The optical system, sequentially arranged from an object side to an image side along an optical axis, comprises: a first lens element (110) with negative refractive power, made of plastic, and having a convex object-side surface (111) and a concave image-side surface (112) in proximity to the optical axis, and both object-side surface (111) and image-side surface (112) being aspheric; a second lens element (120) with positive refractive power, made of plastic, and having a convex object-side surface (121) and a convex image-side surface (122) in proximity to the optical axis, and both object-side surface (121) and image-side surface (122) being aspheric; a third lens element (130) with positive refractive power, made of glass, and having a convex object-side surface (131) and a convex image-side surface (132) in proximity to the optical axis, and both object-side surface (131) and image-side surface (132) being spheric; a fourth lens element (140) with negative refractive power, made of glass, and having a concave object-side surface (141) and a concave image-side surface (142) in proximity to the optical axis, and both object-side surface (141) and image-side surface (142) being spheric, wherein the third lens element (130) and the fourth lens element (140) are cemented into a cemented lens; a fifth lens element (150) with positive refractive power, made of plastic, and having a convex object-side surface (151) and a concave image-side surface (152) in proximity to the optical axis, and both object-side surface (151) and image-side surface (152) being aspheric; an IR-filter (161) made of glass and a cover-glass (162) made of glass, both being made of panel glass which does not affect the focal length of the image pick-up optical system of the present invention, and sequentially installed between the fifth lens element (150) and an image plane (170); and an image sensor (180) installed on the image plane (170). In this preferred embodiment, the image pick-up optical system further comprises an aperture stop (100) formed between the first lens element (110) and the second lens element (120).

The optical data of the image pick-up optical system of this preferred embodiment are listed in Table 1-1 as follows:

TABLE 1-1 f = 2.97 mm, Fno = 1.62, HFOV = 37.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.191227 (ASP) | 1.000 | Plastic | 1.530 | 55.8 | −5.14 |
| 2 | | 1.022624 (ASP) | 3.059 | | | | |
| 3 | Ape. Stop | Plano | 0.079 | | | | |
| 4 | Lens 2 | 50.000000 (ASP) | 1.453 | Plastic | 1.530 | 55.8 | 7.09 |
| 5 | | −4.020389 (ASP) | 0.070 | | | | |
| 6 | Lens 3 | 4.100 | 2.910 | Glass | 1.729 | 54.7 | 3.31 |
| 7 | | −4.100 | 0.010 | Cement | | | |
| 8 | Lens 4 | −4.096 | 0.400 | Glass | 1.847 | 23.8 | −2.86 |
| 9 | | 6.206 | 0.100 | | | | |
| 10 | Lens 5 | 2.851068 (ASP) | 1.923 | Plastic | 1.530 | 55.8 | 5.50 |
| 11 | | 100.00000 (ASP) | 0.700 | | | | |
| 12 | IR-filter | Plano | 0.300 | Glass | 1.516 | 64.1 | — |
| 13 | | Plano | 0.300 | | | | |
| 14 | Cover-glass | Plano | 0.400 | Glass | 1.516 | 64.1 | — |
| 15 | | Plano | 0.242 | | | | |
| 16 | Image | Plano | — | | | | |

Note:
Reference wavelength is 587.6 nm. ASP stands for aspherical surfaces.

Wherein, the object-side surface and the image-side surface of the first lens element (110), the second lens element (120) and the fifth lens element (150) comply with the aspheric surface formula as given in Equation (17), and their aspheric coefficients are listed in Table 1-2 as follows:

TABLE 1-2

Aspheric Coefficients

| Surface # | 1 | 2 | 4 |
|---|---|---|---|
| k = | −2.66629E+00 | −2.14994E+00 | 0.00000E+00 |
| A4 = | 1.84367E−02 | 1.73918E−01 | 5.89333E−03 |
| A6 = | −3.23783E−03 | −6.01810E−02 | 6.48984E−04 |
| A8 = | 1.64538E−04 | 2.44082E−02 | 4.43808E−04 |
| A10 = | −7.07044E−06 | −4.62617E−03 | −1.07624E−04 |
| A12 = | | 1.00001E−04 | |

| Surface # | 5 | 10 | 11 |
|---|---|---|---|
| k = | −7.18296E+00 | −6.70657E+00 | −1.00000E+00 |
| A4 = | −1.33251E−02 | 2.36343E−02 | 2.48644E−02 |
| A6 = | 1.53938E−03 | −5.20590E−03 | 4.42270E−03 |
| A8 = | 1.35143E−04 | 6.16796E−04 | −1.52526E−03 |
| A10 = | −1.01274E−06 | −6.83968E−05 | 1.02329E−04 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined in the previous paragraphs of this section, and thus will not be described here again. Data of related relations are listed in Table 1-3 as follows:

TABLE 1-3

| Relation | Data | Relation | Data |
|---|---|---|---|
| f(mm) | 2.97 | $D_{SR3}/T_{12}$ | 0.03 |
| Fno | 1.62 | $|(R_5 + R_6)/(R_5 − R_6)|$ | 0.00 |
| HFOV | 37.8 | $R_1/R_2$ | 2.14 |
| $f/f_3$ | 0.90 | $|R_4/R_3|$ | 0.08 |
| $f/f_4$ | −1.04 | $R_7/R_8$ | −0.66 |
| $f_2/f_5$ | 1.29 | $|R_9/R_{10}|$ | 0.03 |

TABLE 1-3-continued

| Relation | Data | Relation | Data |
|---|---|---|---|
| f(mm) | 2.97 | $D_{SR3}/T_{12}$ | 0.03 |
| $T_{23}/f$ | 0.02 | $v_3 − v_4$ | 30.9 |
| $CT_1/T_{12}$ | 0.32 | TTL/ImgH | 5.61 |

According to the optical data as shown in Table 1-1 and the aberration curve as shown in FIG. 1B, the image pick-up optical system of in accordance with this preferred embodiment of the present invention provides good correction results in aspects of the longitudinal spherical aberration, astigmatic field curving, and distortion.

Second Preferred Embodiment

Figure 2A:
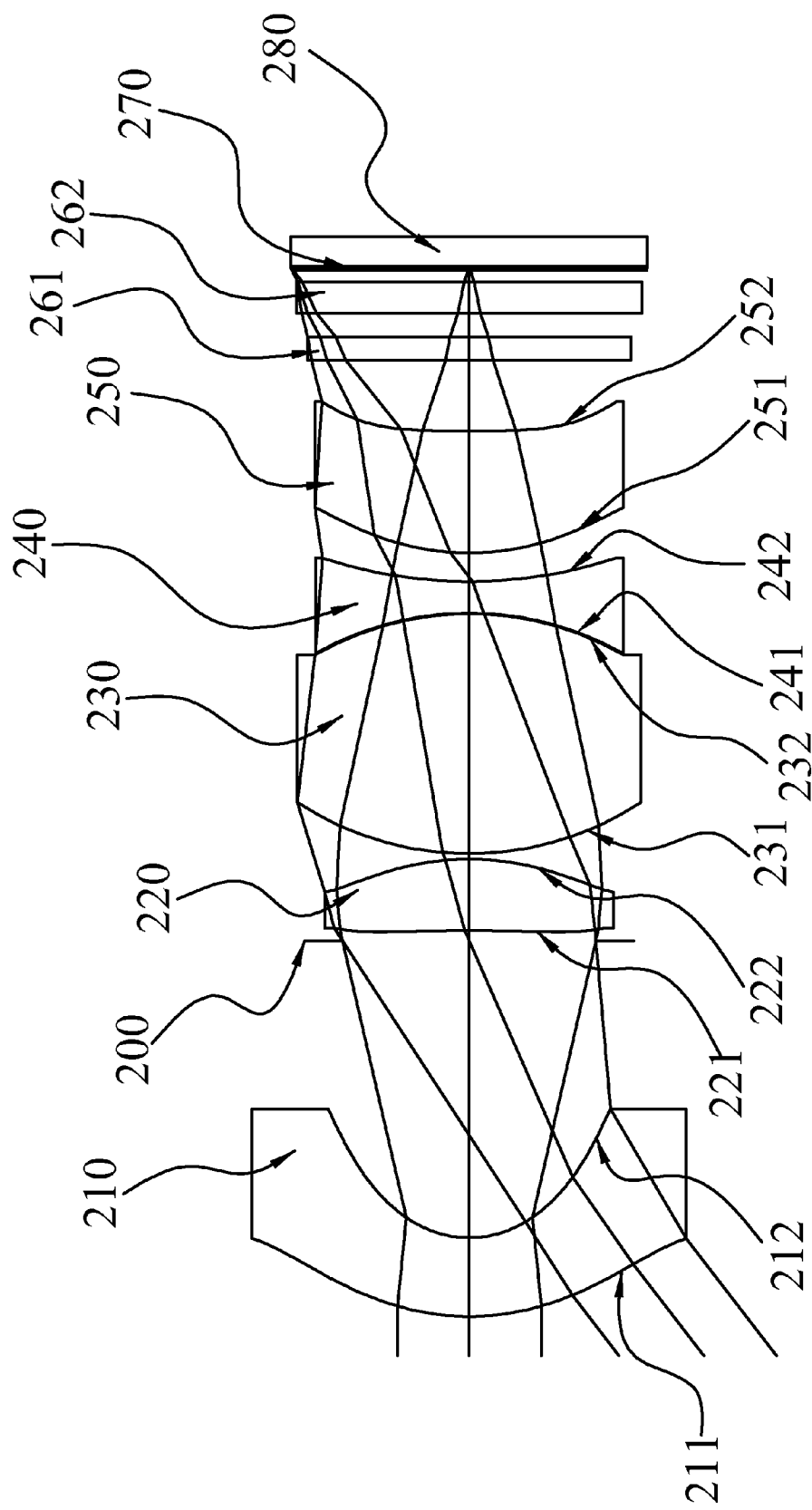
FIG. 2A is a schematic view of an optical system in accordance with the second preferred embodiment of the present invention.
Figure 2B:
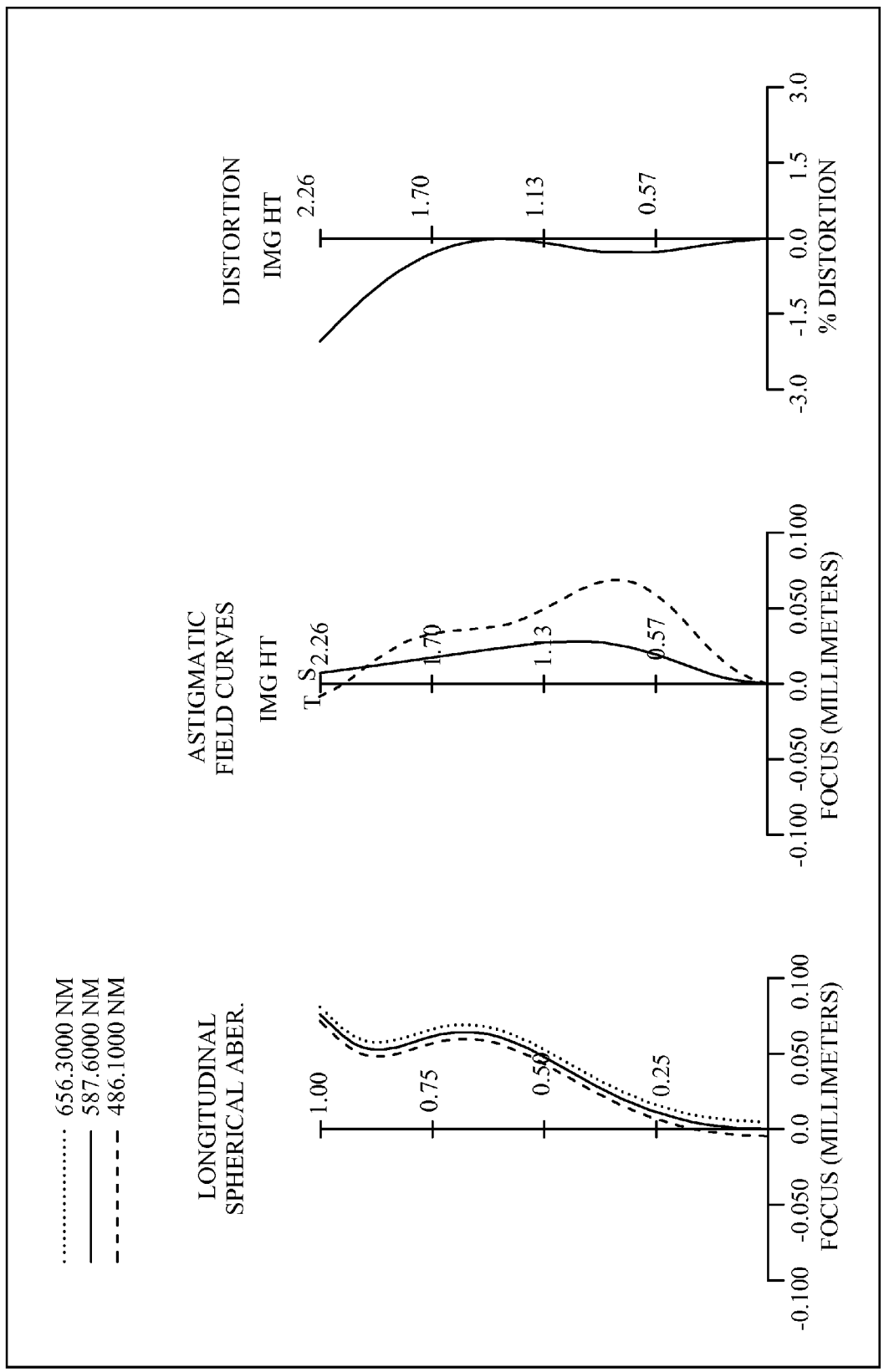
FIG. 2B is a series of aberration curves of the second preferred embodiment of the present invention.

With reference to FIGS. 2A and 2B for a schematic view and a series of aberration curves of an image pick-up optical system in accordance with the second preferred embodiment of the present invention respectively, the image pick-up optical system comprises five lens elements, an IR-filter (261), a cover-glass (262), an aperture stop (200) and an image sensor (280). The optical system, sequentially arranged from an object side to an image side along an optical axis, comprises: a first lens element (210) with negative refractive power, made of plastic, and having a convex object-side surface (211) and a concave image-side surface (212) in proximity to the optical axis, and both object-side surface (211) and image-side surface (212) being aspheric; a second lens element (220) with positive refractive power, made of plastic, and having a concave object-side surface (221) and a convex image-side surface (222) in proximity to the optical axis, and both object-side surface (221) and image-side surface (222) being aspheric; a third lens element (230) with positive refractive power, made of glass, and having a convex object-side surface (231) and a convex image-side surface (232) in proximity to the optical axis, and both object-side surface (231) and image-side surface (232) being spheric; a fourth lens element (240) with negative refractive power, made of glass, and having a concave object-side surface (241) and a concave image-side surface (242) in proximity to the optical axis, and both object-side surface (241) and image-side surface (242) being spheric, wherein the third lens element (230) and the fourth lens element (240) are cemented into a cemented lens; a fifth lens element (250) with positive refractive power, made of plastic, and having a convex object-side surface (251) and a concave image-side surface (252) in proximity to the optical axis, and both object-side surface (251) and image-side surface (252) being aspheric; an IR-filter (261) made of glass and a cover-glass (262) made of glass, both being made of panel glass which does not affect the focal length of the image pick-up optical system of the present invention, and sequentially installed between the fifth lens element (250) and an image plane (270); and an image sensor (280) installed on the image plane (270). In this preferred embodiment, the image pick-up optical system further comprises an aperture stop (200) formed between the first lens element (210) and the second lens element (220).

The optical data of the image pick-up optical system of this preferred embodiment are listed in Table 21 as follows:

TABLE 2-1 f = 2.96 mm, Fno = 1.62, HFOV = 37.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.219653 (ASP) | 1.000 | Plastic | 1.530 | 55.8 | −5.30 |
| 2 | | 1.338737 (ASP) | 3.777 | | | | |
| 3 | Ape. Stop | Plano | 0.130 | | | | |
| 4 | Lens 2 | −25.459161 (ASP) | 0.907 | Plastic | 1.535 | 56.3 | 7.36 |
| 5 | | −3.451279 (ASP) | 0.070 | | | | |
| 6 | Lens 3 | 3.974 | 3.050 | Glass | 1.729 | 54.7 | 3.25 |
| 7 | | −3.974 | 0.010 | Cement | | | |
| 8 | Lens 4 | −3.971 | 0.400 | Glass | 1.847 | 23.8 | −2.76 |
| 9 | | 5.960 | 0.367 | | | | |
| 10 | Lens 5 | 3.283615 (ASP) | 1.548 | Plastic | 1.530 | 55.8 | 6.82 |
| 11 | | 30.129603 (ASP) | 0.900 | | | | |
| 12 | IR-filter | Plano | 0.300 | Glass | 1.516 | 64.1 | — |
| 13 | | Plano | 0.300 | | | | |
| 14 | Cover-glass | Plano | 0.400 | Glass | 1.516 | 64.1 | — |
| 15 | | Plano | 0.173 | | | | |
| 16 | Image | Plano | — | | | | |

Note:
Reference wavelength is 587.6 nm. ASP stands for aspherical surfaces.

Wherein, the object-side surface and the image-side surface of the first lens element (210) to the fifth lens element (250) comply with the aspheric surface formula as given in Equation (17), and their aspheric coefficients are listed in Table 2-2 as follows:

TABLE 2-2

Aspheric Coefficients

| Surface # | 1 | 2 | 4 |
|---|---|---|---|
| k = | −2.63631E+00 | −2.16471E+00 | 0.00000E+00 |
| A4 = | 9.28772E−03 | 1.06220E−01 | 3.95681E−03 |
| A6 = | −1.44409E−03 | −2.57617E−02 | 2.24058E−03 |
| A8 = | 6.84836E−05 | 8.81116E−03 | −3.71702E−04 |
| A10 = | −3.59071E−06 | −9.45191E−04 | 1.25700E−04 |
| A12 = | | −8.33269E−05 | |

| Surface # | 5 | 10 | 11 |
|---|---|---|---|
| k = | −4.26661E+00 | −9.46205E+00 | −1.00000E+00 |
| A4 = | −1.12680E−02 | 2.63974E−02 | 2.31453E−02 |
| A6 = | 3.78249E−03 | −3.92346E−03 | 5.14780E−03 |
| A8 = | −1.12571E−03 | 1.89535E−04 | −1.57901E−03 |
| A10 = | 2.73025E−04 | −2.88799E−05 | 9.10225E−05 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 2-3 as follows:

TABLE 2-3

| Relation | Data | Relation | Data |
|---|---|---|---|
| f(mm) | 2.96 | $D_{SR3}/T_{12}$ | 0.03 |
| Fno | 1.62 | $|(R_5 + R_6)/(R_5 - R_6)|$ | 0.00 |
| HFOV | 37.6 | $R_1/R_2$ | 2.40 |
| $f/f_3$ | 0.91 | $|R_4/R_3|$ | 0.14 |
| $f/f_4$ | −1.07 | $R_7/R_8$ | −0.67 |
| $f_2/f_5$ | 1.08 | $|R_9/R_{10}|$ | 0.11 |
| $T_{23}/f$ | 0.02 | $v_3 - v_4$ | 30.7 |
| $CT_1/T_{12}$ | 0.26 | TTL/ImgH | 5.78 |

According to the optical data as shown in Table 2-1 and the aberration curve as shown in FIG. 2B, the image pick-up optical system of in accordance with this preferred embodiment of the present invention provides good correction results in aspects of the longitudinal spherical aberration, astigmatic field curving, and distortion.

Third Preferred Embodiment

Figure 3A:
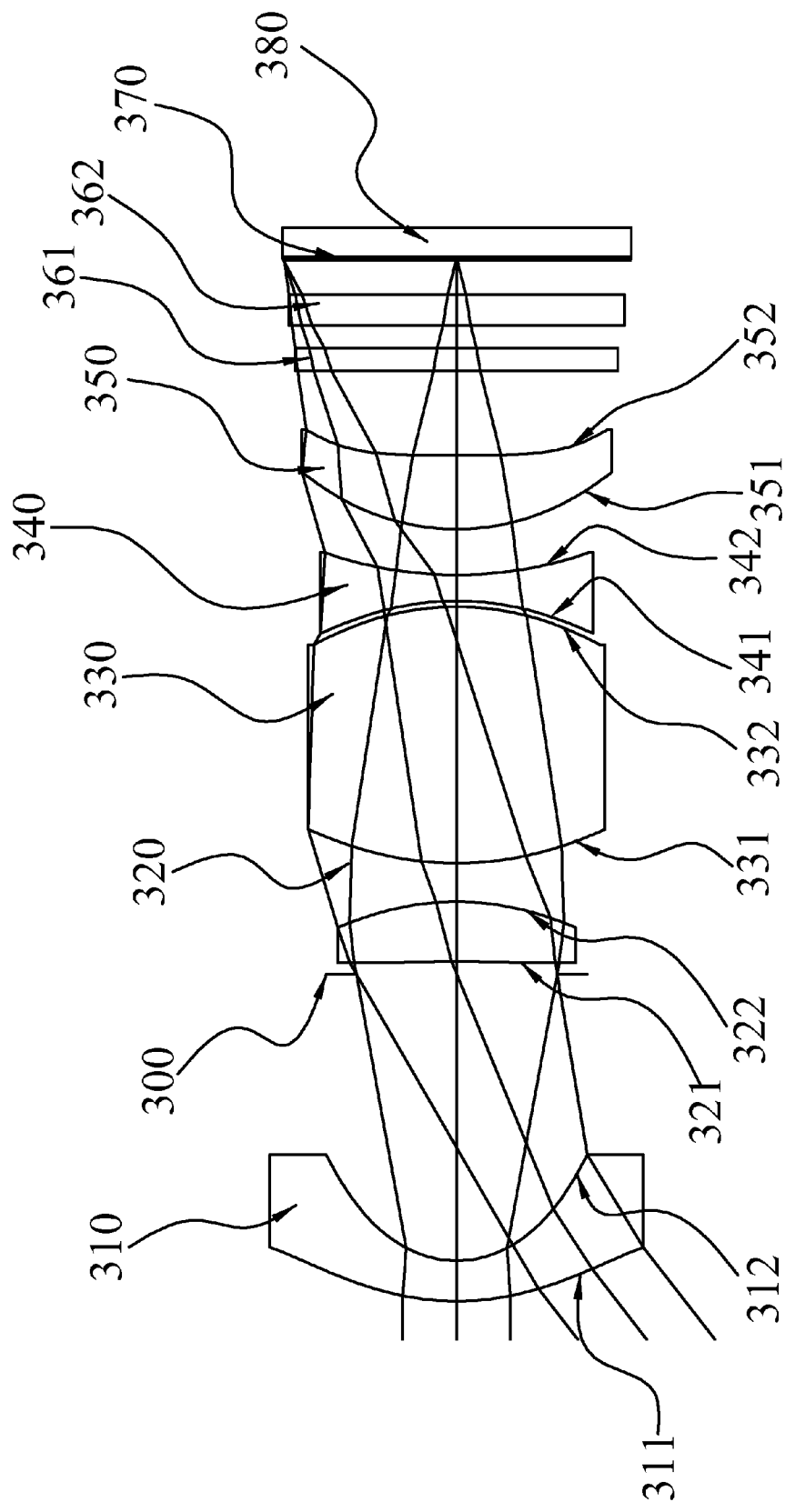
FIG. 3A is a schematic view of an optical system in accordance with the third preferred embodiment of the present invention.
Figure 3B:
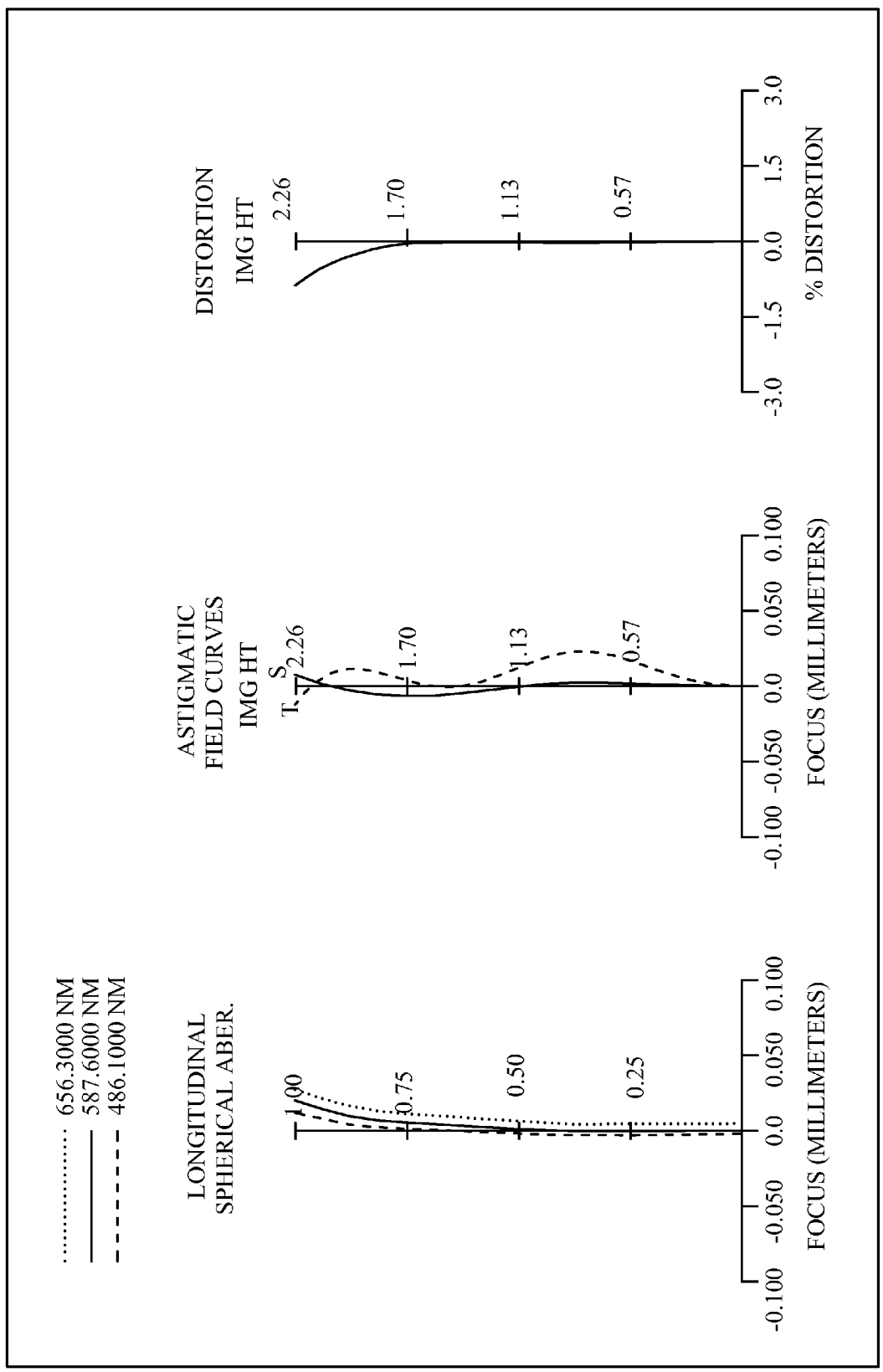
FIG. 3B is a series of aberration curves of the third preferred embodiment of the present invention.

With reference to FIGS. 3A and 3B for a schematic view and a series of aberration curves of an image pick-up optical system in accordance with the third preferred embodiment of the present invention respectively, the image pick-up optical system comprises five lens elements, an IR-filter (361), a cover-glass (362), an aperture stop (300) and an image sensor (380). The optical system, sequentially arranged from an object side to an image side along an optical axis, comprises: a first lens element (310) with negative refractive power, made of plastic, and having a convex object-side surface (311) and a concave image-side surface (312) in proximity to the optical axis, and both object-side surface (311) and image-side surface (312) being aspheric; a second lens element (320) with positive refractive power, made of plastic, and having a concave object-side surface (321) and a convex image-side surface (322) in proximity to the optical axis, and both object-side surface (321) and image-side surface (322) being aspheric; a third lens element (330) with positive refractive power, made of glass, and having a convex object-side surface (331) and a convex image-side surface (332) in proximity to the optical axis, and both object-side surface (331) and image-side surface (332) being aspheric; a fourth lens element (340) with negative refractive power, made of glass, and having a concave object-side surface (341) and a concave image-side surface (342) in proximity to the optical axis, and both object-side surface (341) and image-side surface (342) being aspheric; a fifth lens element (350) with positive refractive power, made of plastic, and having a convex object-side surface (351) and a concave image-side surface (352) in proximity to the optical axis, and both object-side surface (351) and image-side surface (352) being aspheric; an IR-filter (361) made of glass and a cover-glass (362) made of glass, both being made of panel glass which does not affect the focal length of the image pick-up optical system of the present invention, and sequentially installed between the fifth lens element (350) and an image plane (370); and an image sensor (380) installed on the image plane (370). In this preferred embodiment, the image pick-up optical system further comprises an aperture stop (300) formed between the first lens element (310) and the second lens element (320).

The optical data of the image pick-up optical system of this preferred embodiment are listed in Table 3-1 as follows:

TABLE 3-1 f = 2.95 mm, Fno = 2.10, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.429960 (ASP) | 0.530 | Plastic | 1.530 | 55.8 | −4.53 |
| 2 | | 1.337431 (ASP) | 3.746 | | | | |
| 3 | Ape. Stop | Plano | 0.165 | | | | |
| 4 | Lens 2 | −25.947847 (ASP) | 0.781 | Plastic | 1.535 | 56.3 | 7.65 |
| 5 | | −3.568131 (ASP) | 0.505 | | | | |
| 6 | Lens 3 | 4.218932 (ASP) | 3.352 | Glass | 1.779 | 54.5 | 3.26 |
| 7 | | −3.632609 (ASP) | 0.076 | | | | |
| 8 | Lens 4 | −3.732959 (ASP) | 0.342 | Glass | 1.847 | 23.8 | −2.51 |
| 9 | | 5.133280 (ASP) | 0.598 | | | | |
| 10 | Lens 5 | 2.918446 (ASP) | 0.966 | Plastic | 1.530 | 55.8 | 5.71 |
| 11 | | 72.404757 (ASP) | 1.100 | | | | |
| 12 | IR-filter | Plano | 0.300 | Glass | 1.516 | 64.1 | — |
| 13 | | Plano | 0.300 | | | | |
| 14 | Cover-glass | Plano | 0.400 | Glass | 1.516 | 64.1 | — |
| 15 | | Plano | 0.475 | | | | |
| 16 | Image | Plano | — | | | | |

Note:
Reference wavelength is 587.6 nm. ASP stands for aspherical surfaces.

Wherein, the object-side surface and the image-side surface of the first lens element (310) to the fifth lens element (350) comply with the aspheric surface formula as given in Equation (17), and their aspheric coefficients are listed in Table 3-2 as follows:

TABLE 3-2

Aspheric Coeficients

| Surface # | 1 | 2 | 4 | 5 | 6 |
|---|---|---|---|---|---|
| k = | −4.72432E+00 | −2.48696E+00 | 0.00000E+00 | −4.76962E+00 | −1.90998E−01 |
| A4 = | 8.39724E−03 | 1.03030E−01 | 4.94739E−03 | −1.14924E−02 | −6.22847E−04 |
| A6 = | −1.38300E−03 | −2.40466E−02 | 1.32816E−03 | 2.84882E−03 | −2.57495E−04 |
| A8 = | 7.08851E−05 | 8.09845E−03 | −1.17961E−03 | −1.33026E−03 | −2.70985E−06 |
| A10 = | −4.62848E−06 | −8.73155E−04 | 3.65501E−04 | 3.38886E−04 | |
| A12 = | | −8.98091E−05 | | | |

| Surface # | 7 | 8 | 9 | 10 | 11 |
|---|---|---|---|---|---|
| k = | −3.99742E−02 | −5.29318E−03 | 0.00000E+00 | −7.37858E+00 | −1.00000E+00 |
| A4 = | 3.55129E−04 | 6.84300E−04 | −3.03554E−03 | 2.55958E−02 | 1.36873E−02 |
| A6 = | 2.64454E−04 | −8.70260E−05 | 2.69753E−04 | −3.43049E−03 | 5.02823E−03 |
| A8 = | −8.20764E−05 | 1.79232E−04 | 5.58189E−05 | 5.37341E−04 | −9.07634E−04 |
| A10 = | 2.76457E−05 | 1.83100E−05 | 5.78061E−05 | −5.44750E−05 | 1.74893E−05 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 3-3 as follows:

TABLE 3-3

| Relation f(mm) | Data | Relation | Data |
|---|---|---|---|
|  | 2.95 | $D_{SR3}/T_{12}$ | 0.04 |
| Fno | 2.10 | $|(R_5 + R_6)/(R_5 - R_6)|$ | 0.07 |
| HFOV | 37.7 | $R_1/R_2$ | 2.56 |
| $f/f_3$ | 0.90 | $|R_4/R_3|$ | 0.14 |
| $f/f_4$ | -1.18 | $R_7/R_8$ | -0.73 |
| $f_2/f_5$ | 1.34 | $|R_9/R_{10}|$ | 0.04 |
| $T_{23}/f$ | 0.17 | $v_3 - v_4$ | 30.7 |
| $CT_1/T_{12}$ | 0.14 | TTL/ImgH | 5.92 |

According to the optical data as shown in Table 3-1 and the aberration curve as shown in FIG. 3B, the image pick-up optical system of in accordance with this preferred embodiment of the present invention provides good correction results in aspects of the longitudinal spherical aberration, astigmatic field curving, and distortion.

Fourth Preferred Embodiment

Figure 4A:
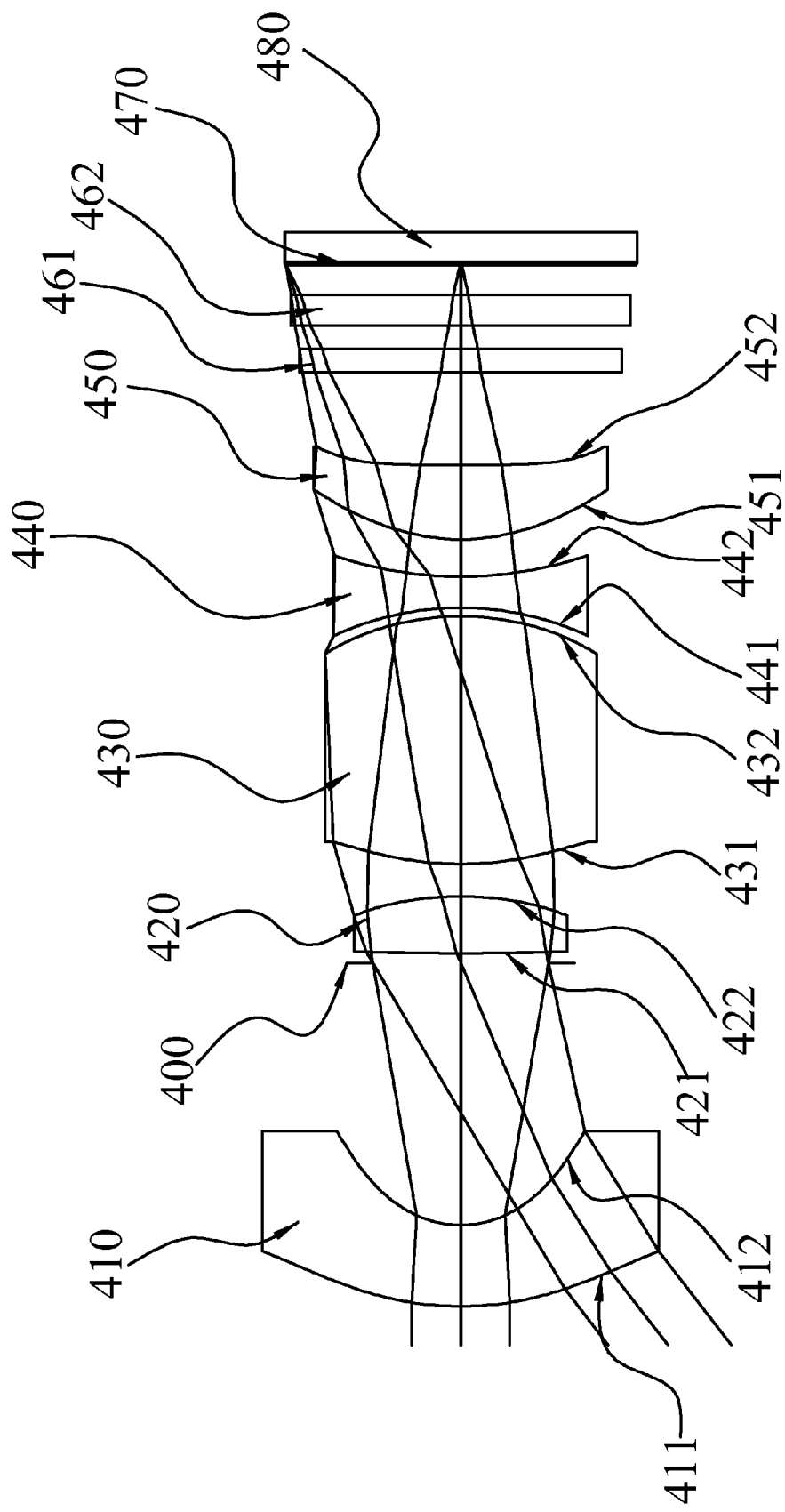
FIG. 4A is a schematic view of an optical system in accordance with the fourth preferred embodiment of the present invention.
Figure 4B:
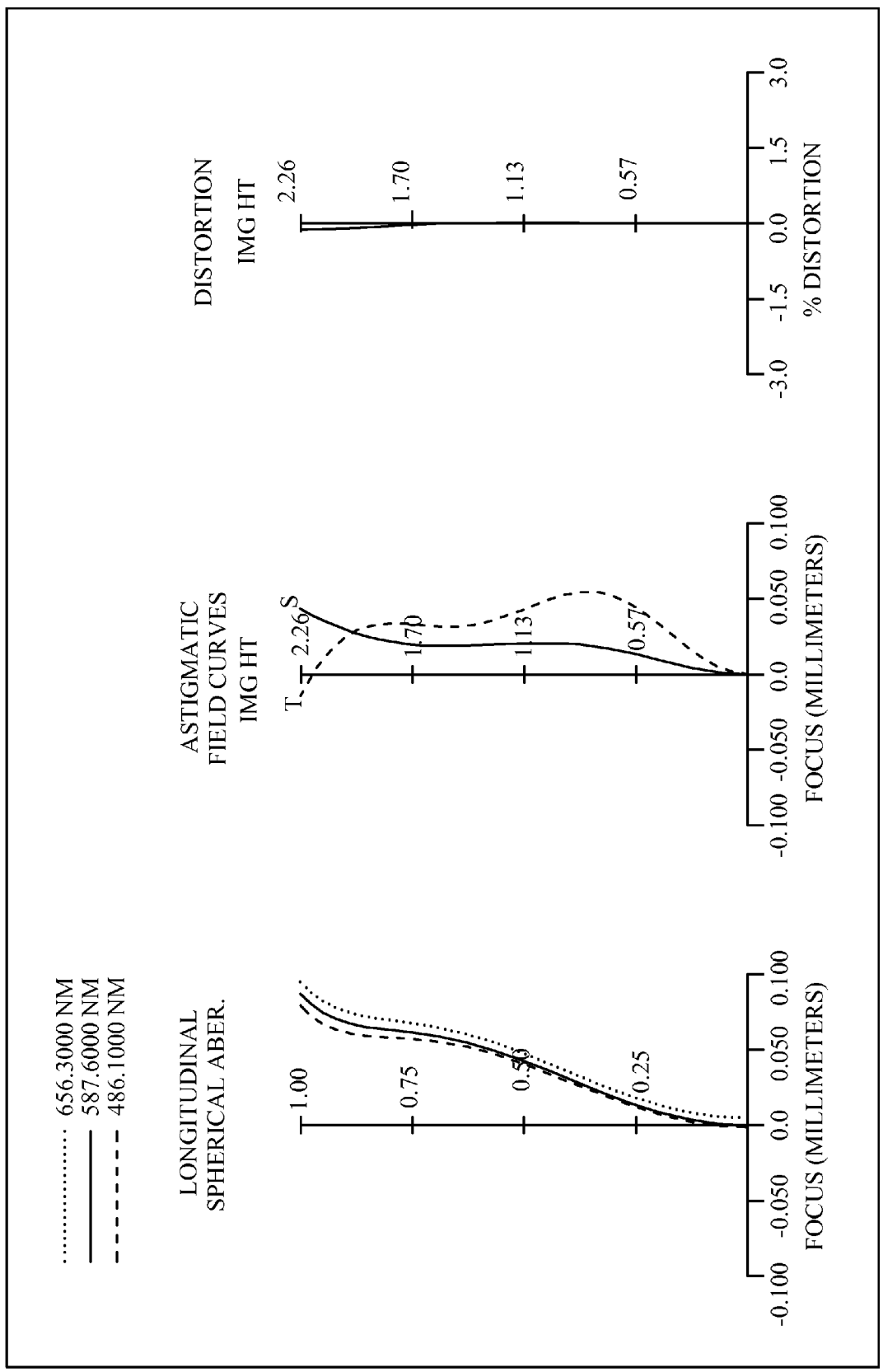
FIG. 4B is a series of aberration curves of the fourth preferred embodiment of the present invention.

With reference to FIGS. 4A and 4B for a schematic view and a series of aberration curves of an image pick-up optical system in accordance with the fourth preferred embodiment of the present invention respectively, the image pick-up optical system comprises five lens elements, an IR-filter (461), a cover-glass (462), an aperture stop (400) and an image sensor (480). The optical system, sequentially arranged from an object side to an image side along an optical axis, comprises: a first lens element (410) with negative refractive power, made of plastic, and having a convex object-side surface (411) and a concave image-side surface (412) in proximity to the optical axis, and both object-side surface (411) and image-side surface (412) being aspheric; a second lens element (420) with positive refractive power, made of plastic, and having a convex object-side surface (421) and a convex image-side surface (422) in proximity to the optical axis, and both object-side surface (421) and image-side surface (422) being aspheric; a third lens element (430) with positive refractive power, made of glass, and having a convex object-side surface (431) and a convex image-side surface (432) in proximity to the optical axis, and both object-side surface (431) and image-side surface (432) being aspheric; a fourth lens element (440) with negative refractive power, made of glass, and having a concave object-side surface (441) and a concave image-side surface (442) in proximity to the optical axis, and both object-side surface (441) and image-side surface (442) being aspheric; a fifth lens element (450) with positive refractive power, made of plastic, and having a convex object-side surface (451) and a concave image-side surface (452) in proximity to the optical axis, and both object-side surface (451) and image-side surface (452) being aspheric; an IR-filter (461) made of glass and a cover-glass (462) made of glass, both being made of panel glass which does not affect the focal length of the image pick-up optical system of the present invention, and sequentially installed between the fifth lens element (450) and an image plane (470); and an image sensor (480) installed on the image plane (470). In this preferred embodiment, the image pick-up optical system further comprises an aperture stop (400) formed between the first lens element (410) and the second lens element (420).

The optical data of the image pick-up optical system of this preferred embodiment are listed in Table 4-1 as follows:

TABLE 4-1 f = 2.91 mm, Fno = 2.30, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 4.079129 (ASP) | 1.047 | Plastic | 1.544 | 55.9 | -4.21 |
| 2 | | 1.334109 (ASP) | 3.382 | | | | |
| 3 | Ape. Stop | Plano | 0.128 | | | | |
| 4 | Lens 2 | 48.069221 (ASP) | 0.735 | Plastic | 1.530 | 55.8 | 7.25 |
| 5 | | -4.151257 (ASP) | 0.420 | | | | |
| 6 | Lens 3 | 4.214580 (ASP) | 3.196 | Glass | 1.729 | 54.5 | 3.17 |
| 7 | | -3.488060 (ASP) | 0.112 | | | | |
| 8 | Lens 4 | -3.859727 (ASP) | 0.401 | Glass | 1.847 | 23.8 | -2.44 |
| 9 | | 4.649684 (ASP) | 0.483 | | | | |
| 10 | Lens 5 | 2.564791 (ASP) | 0.958 | Plastic | 1.530 | 55.8 | 5.01 |
| 11 | | 64.509270 (ASP) | 1.200 | | | | |
| 12 | IR-filter | Plano | 0.300 | Glass | 1.516 | 64.1 | — |
| 13 | | Plano | 0.300 | | | | |
| 14 | Cover-glass | Plano | 0.400 | Glass | 1.516 | 64.1 | — |
| 15 | | Plano | 0.402 | | | | |
| 16 | Image | Plano | — | | | | |

Note:
Reference wavelength is 587.6 nm. ASP stands for aspherical surfaces.

Wherein, the object-side surface and the image-side surface of the first lens element (410) to the fifth lens element (450) comply with the aspheric surface formula as given in Equation (17), and their aspheric coefficients are listed in Table 4-2 as follows:

TABLE 4-2

| | Aspheric Coefficients | | | | |
|---|---|---|---|---|---|
| Surface # | 1 | 2 | 4 | 5 | 6 |
| k = | −4.68209E+00 | −2.15316E+00 | 0.00000E+00 | −6.07386E+00 | −8.01050E−01 |
| A4 = | 8.93399E−03 | 1.02117E−01 | 5.26464E−03 | −1.00716E−02 | −1.91955E−03 |
| A6 = | −1.53209E−03 | −2.12956E−02 | 1.52809E−03 | 5.40596E−04 | −8.34906E−04 |
| A8 = | 9.62717E−05 | 8.21180E−03 | −2.35704E−03 | −1.67030E−03 | −1.65457E−04 |
| A10 = | −3.67770E−06 | −1.75543E−03 | 1.59802E−04 | 1.57886E−04 | |
| A12 = | | 6.19459E−05 | | | |
| Surface # | 7 | 8 | 9 | 10 | 11 |
| k = | −2.53538E−03 | 1.99546E−02 | 0.00000E+00 | −7.38713E+00 | −1.00000E+00 |
| A4 = | 1.45083E−04 | 8.80110E−04 | −6.07285E−03 | 2.33066E−02 | 5.22521E−03 |
| A6 = | 2.76626E−04 | −9.02972E−04 | 1.19402E−03 | −3.41982E−03 | 7.22062E−03 |
| A8 = | −4.65162E−04 | 3.17479E−04 | −2.98351E−04 | 5.34943E−04 | −1.19653E−03 |
| A10 = | 7.36120E−05 | −9.35615E−06 | 1.00341E−04 | −5.71907E−05 | 4.26826E−05 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 4-3 as follows:

TABLE 4-3

| Relation | Data | Relation | Data |
|---|---|---|---|
| f(mm) | 2.91 | $D_{SR3}/T_{12}$ | 0.04 |
| Fno | 2.30 | $|(R_5 + R_6)/(R_5 − R_6)|$ | 0.09 |
| HFOV | 37.7 | $R_1/R_2$ | 3.06 |
| $f/f_3$ | 0.92 | $|R_4/R_3|$ | 0.09 |
| $f/f_4$ | −1.19 | $R_7/R_8$ | −0.83 |
| $f_2/f_5$ | 1.45 | $|R_9/R_{10}|$ | 0.04 |
| $T_{23}/f$ | 0.14 | $v_3 − v_4$ | 30.7 |
| $CT_1/T_{12}$ | 0.30 | TTL/ImgH | 5.84 |

According to the optical data as shown in Table 4-1 and the aberration curve as shown in FIG. 4B, the image pick-up optical system of in accordance with this preferred embodiment of the present invention provides good correction results in aspects of the longitudinal spherical aberration, astigmatic field curving, and distortion.

Fifth Preferred Embodiment

Figure 5A:
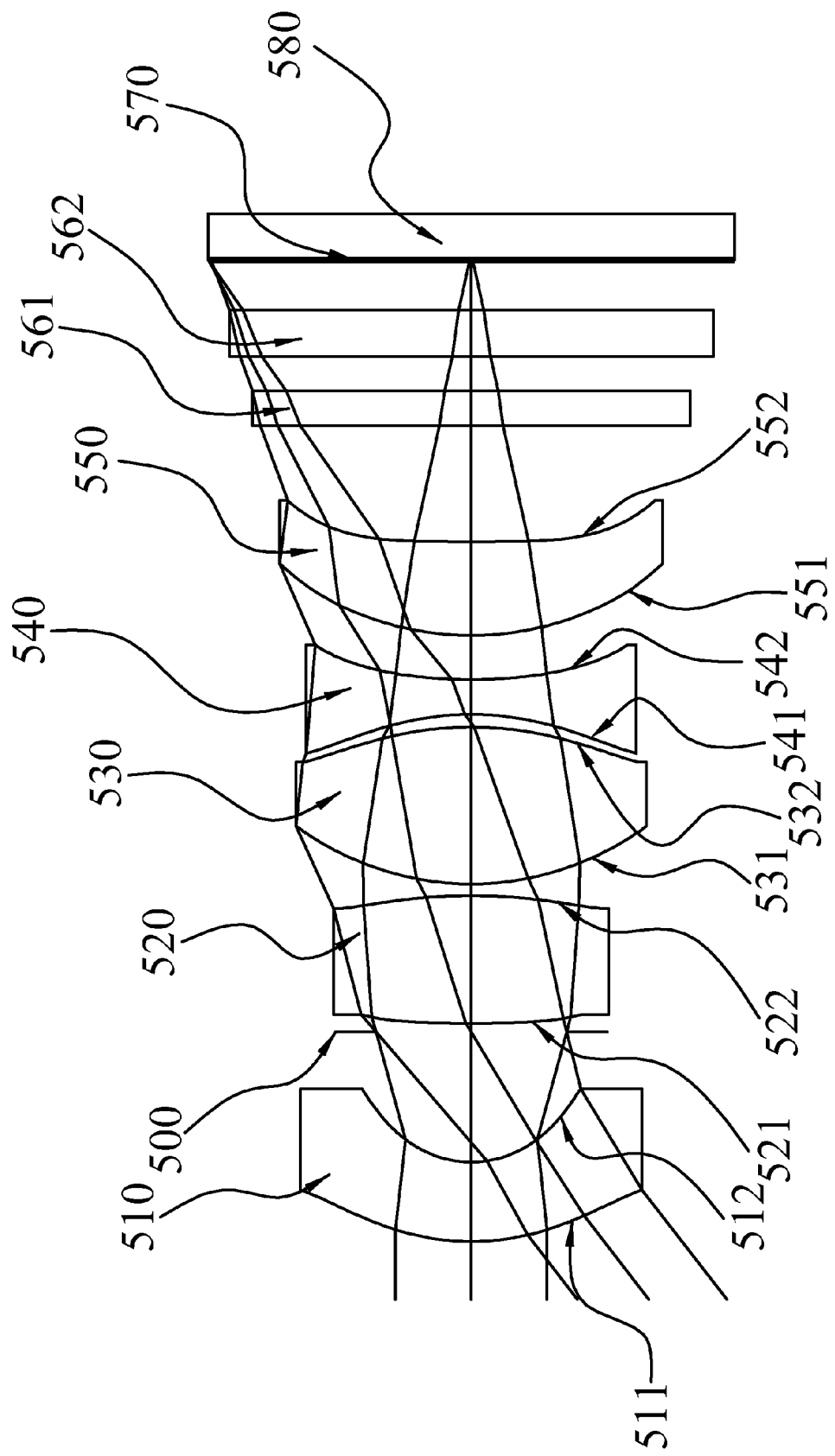
FIG. 5A is a schematic view of an optical system in accordance with the fifth preferred embodiment of the present invention.
Figure 5B:
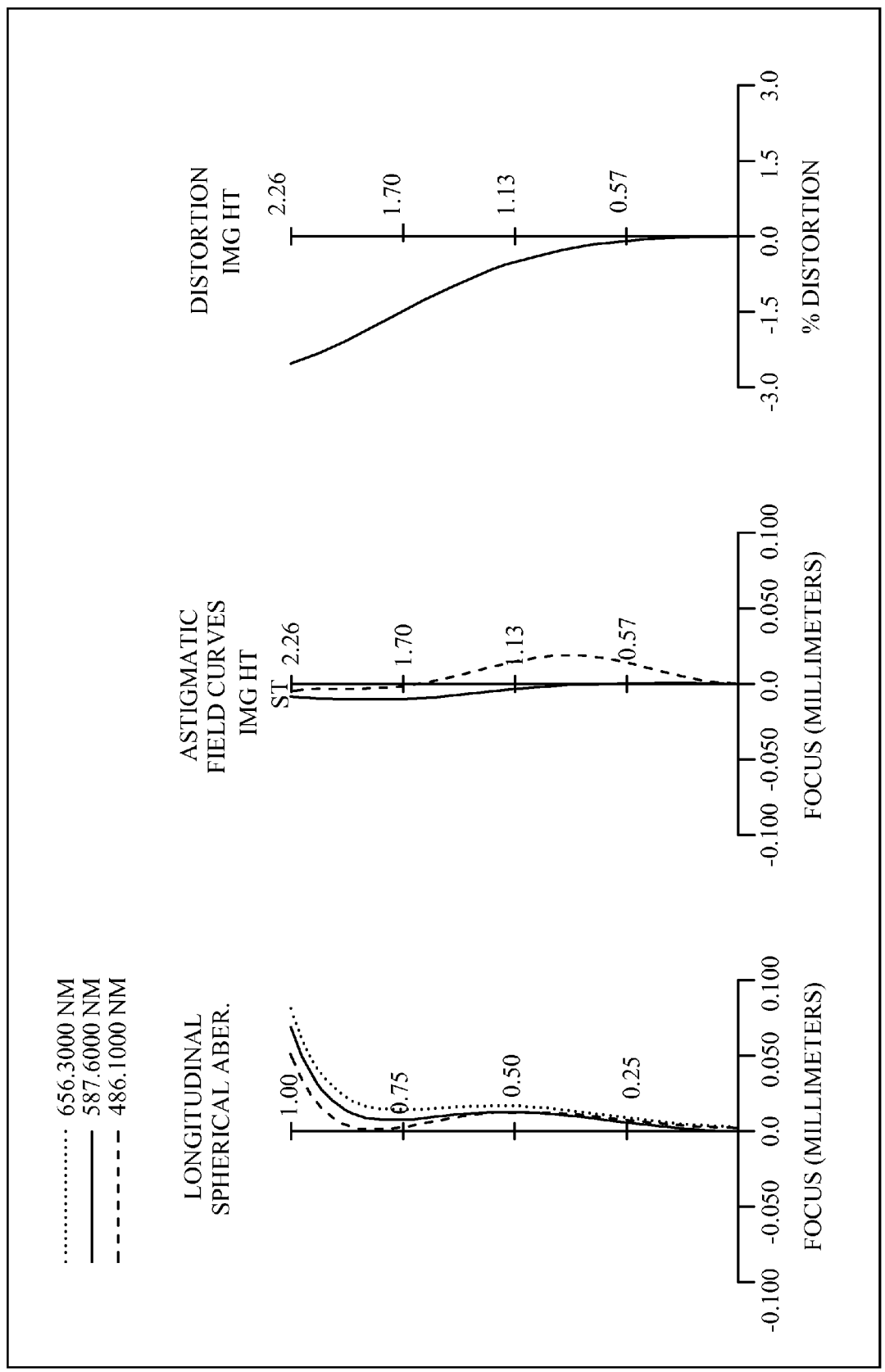
FIG. 5B is a series of aberration curves of the fifth preferred embodiment of the present invention.

With reference to FIGS. 5A and 5B for a schematic view and a series of aberration curves of an image pick-up optical system in accordance with the fifth preferred embodiment of the present invention respectively, the image pick-up optical system comprises five lens elements, an IR-filter (561), a cover-glass (562), an aperture stop (500) and an image sensor (580). The optical system, sequentially arranged from an object side to an image side along an optical axis, comprises: a first lens element (510) with negative refractive power, made of plastic, and having a convex object-side surface (511) and a concave image-side surface (512) in proximity to the optical axis, and both object-side surface (511) and image-side surface (512) being aspheric; a second lens element (520) with positive refractive power, made of plastic, and having a convex object-side surface (521) and a convex image-side surface (522) in proximity to the optical axis, and both object-side surface (521) and image-side surface (522) being aspheric; a third lens element (530) with positive refractive power, made of glass, and having a convex object-side surface (531) and a convex image-side surface (532) in proximity to the optical axis, and both object-side surface (531) and image-side surface (532) being aspheric; a fourth lens element (540) with negative refractive power, made of glass, and having a concave object-side surface (541) and a concave image-side surface (542) in proximity to the optical axis, and both object-side surface (541) and image-side surface (542) being aspheric; a fifth lens element (550) with positive refractive power, made of plastic, and having a convex object-side surface (551) and a concave image-side surface (552) in proximity to the optical axis, and both object-side surface (551) and image-side surface (552) being aspheric; an IR-filter (561) made of glass and a cover-glass (562) made of glass, both being made of panel glass which does not affect the focal length of the image pick-up optical system of the present invention, and sequentially installed between the fifth lens element (550) and an image plane (570); and an image sensor (580) installed on the image plane (570). In this preferred embodiment, the image pick-up optical system further comprises an aperture stop (500) formed between the first lens element (510) and the second lens element (520).

The optical data of the image pick-up optical system of this preferred embodiment are listed in Table 5-1 as follows:

TABLE 5-1

| | f = 3.00 mm, Fno = 2.30, HFOV = 37.7 deg. | | | | | |
|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 2.091918 (ASP) | 0.685 | Plastic | 1.544 | 55.9 | −3.59 |
| 2 | | 0.893579 (ASP) | 1.124 | | | | |
| 3 | Ape. Stop | Plano | 0.076 | | | | |
| 4 | Lens 2 | 16.830887 (ASP) | 1.100 | Glass | 1.678 | 55.2 | 5.69 |
| 5 | | −4.871057 (ASP) | 0.101 | | | | |
| 6 | Lens 3 | 2.454296 (ASP) | 1.354 | Glass | 1.729 | 54.5 | 2.06 |

TABLE 5-1-continued f = 3.00 mm, Fno = 2.30, HFOV = 37.7 deg.

| Surface # | | Curvature Radius | Thickness | Material | Index | Abbe # | Focal Length |
|---|---|---|---|---|---|---|---|
| 7 | | −2.977992 (ASP) | 0.111 | | | | |
| 8 | Lens 4 | −2.430212 (ASP) | 0.300 | Glass | 1.762 | 26.6 | −1.99 |
| 9 | | 4.231951 (ASP) | 0.380 | | | | |
| 10 | Lens 5 | 2.477350 (ASP) | 0.810 | Plastic | 1.530 | 55.8 | 4.80 |
| 11 | | 87.260035 (ASP) | 1.000 | | | | |
| 12 | IR-filter | Plano | 0.300 | Glass | 1.516 | 64.1 | — |
| 13 | | Plano | 0.300 | | | | |
| 14 | Cover-glass | Plano | 0.400 | Glass | 1.516 | 64.1 | — |
| 15 | | Plano | 0.433 | | | | |
| 16 | Image | Plano | — | | | | |

Note:
Reference wavelength is 587.6 nm. ASP stands for aspherical surfaces.

Wherein, the object-side surface and the image-side surface of the first lens element (510) to the fifth element (550) comply with the aspheric surface formula as given in Equation (17), and their aspheric coefficients are listed in Table 5-2 as follows:

TABLE 5-2

Aspheric Coefficients

| Surface # | 1 | 2 | 4 | 5 | 6 |
|---|---|---|---|---|---|
| k = | −1.87462E+00 | −1.16701E+00 | 0.00000E+00 | −8.30820E+00 | −5.75605E−01 |
| A4 = | 1.63453E−02 | 1.78358E−01 | 4.69817E−02 | −6.83777E−03 | −7.98962E−04 |
| A6 = | −6.47352E−03 | 1.75351E−02 | 1.08041E−02 | 4.73319E−04 | 1.38693E−03 |
| A8 = | −2.95764E−03 | 2.15853E−02 | 4.32578E−03 | 4.58649E−03 | 3.84280E−05 |
| A10 = | 5.98237E−04 | 1.78723E−02 | −4.01880E−03 | 2.38050E−03 | |
| A12 = | | −3.57204E−02 | | | |

| Surface # | 7 | 8 | 9 | 10 | 11 |
|---|---|---|---|---|---|
| k = | −4.01806E−01 | −1.45232E+00 | 2.88575E+00 | −6.72278E+00 | −1.00000E+00 |
| A4 = | 1.20292E−03 | 7.00220E−03 | −2.29118E−03 | 3.15169E−02 | 5.25561E−02 |
| A6 = | 6.26566E−03 | −1.17347E−03 | 1.51190E−02 | −1.08048E−03 | 1.67740E−03 |
| A8 = | −1.26259E−03 | 2.78446E−03 | −2.93398E−03 | 6.08612E−04 | −1.22694E−03 |
| A10 = | 6.20772E−04 | −7.47638E−05 | 3.16798E−04 | −3.24022E−05 | 3.33238E−04 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 5-3 as follows:

TABLE 5-3

| Relation | Data | Relation | Data |
|---|---|---|---|
| f(mm) | 3.00 | $D_{SR3}/T_{12}$ | 0.06 |
| Fno | 2.30 | $|(R_5 + R_6)/(R_5 − R_6)|$ | 0.10 |
| HFOV | 37.7 | $R_1/R_2$ | 2.34 |
| $f/f_3$ | 1.46 | $|R_4/R_3|$ | 0.29 |
| $f/f_4$ | −1.51 | $R_7/R_8$ | −0.57 |
| $f_2/f_5$ | 1.19 | $|R_9/R_{10}|$ | 0.03 |
| $T_{23}/f$ | 0.03 | $v_3 − v_4$ | 27.9 |
| $CT_1/T_{12}$ | 0.57 | TTL/ImgH | 3.64 |

According to the optical data as shown in Table 5-1 and the aberration curve as shown in FIG. 5B, the image pick-up optical system of in accordance with this preferred embodiment of the present invention provides good correction results in aspects of the longitudinal spherical aberration, astigmatic field curving, and distortion.

Sixth Preferred Embodiment

Figure 6A:
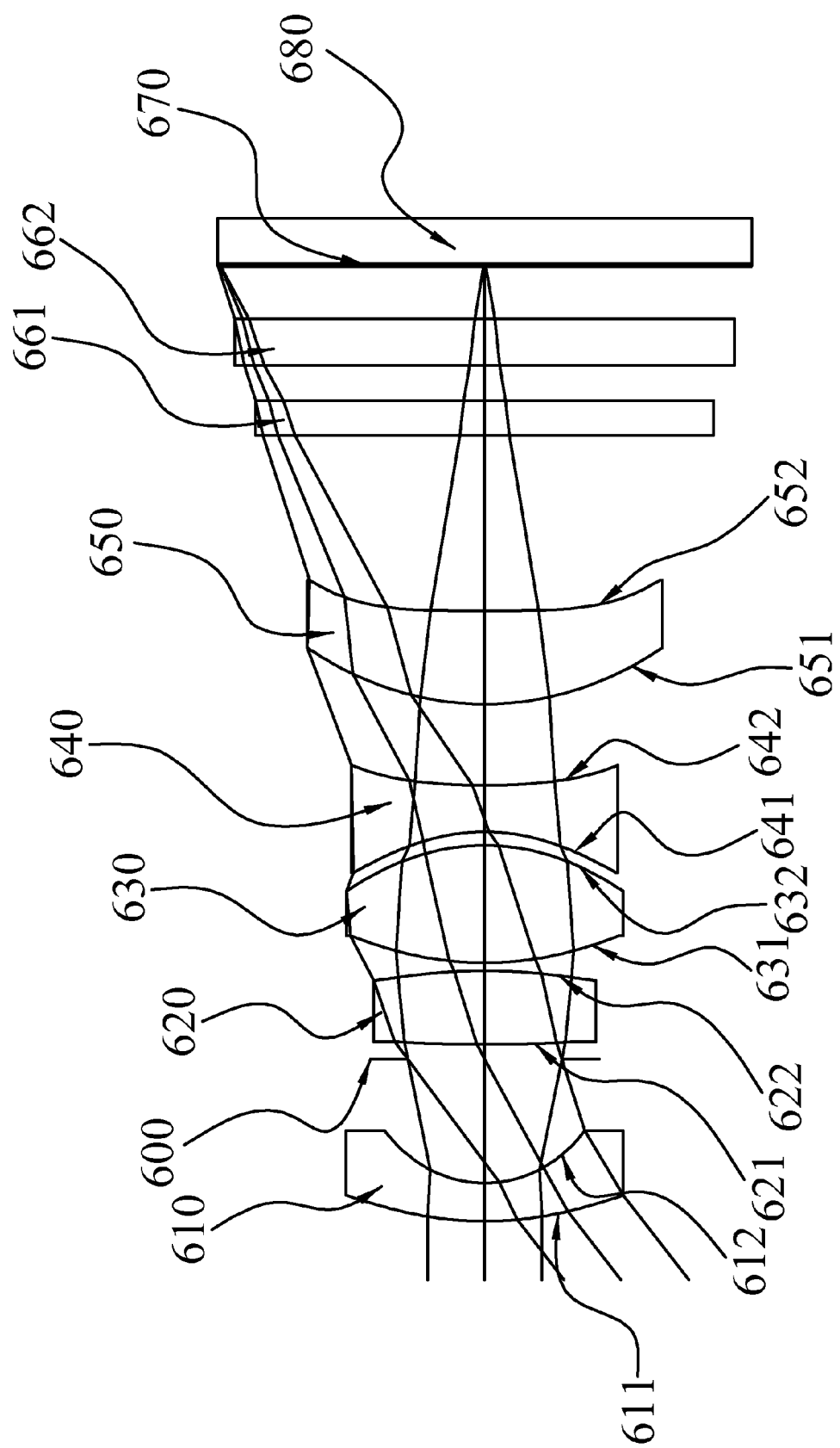
FIG. 6A is a schematic view of an optical system in accordance with the sixth preferred embodiment of the present invention.
Figure 6B:
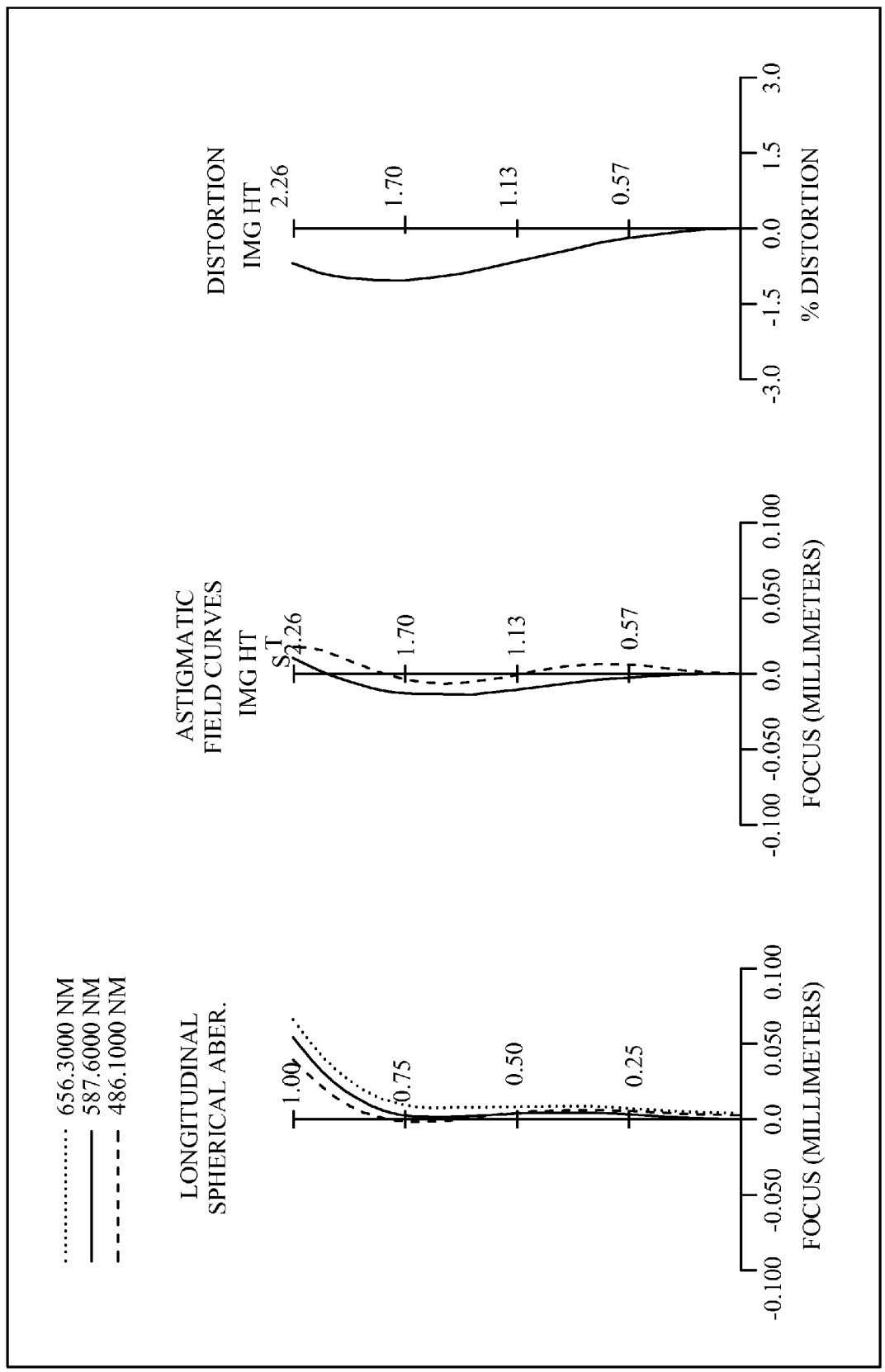
FIG. 6B is a series of aberration curves of the sixth preferred embodiment of the present invention.

With reference to FIGS. 6A and 6B for a schematic view and a series of aberration curves of an image pick-up optical system in accordance with the sixth preferred embodiment of the present invention respectively, the image pick-up optical system comprises five lens elements, an IR-filter (661), a cover-glass (662), an aperture stop (600) and an image sensor (680). The optical system, sequentially arranged from an object side to an image side along an optical axis, comprises: a first lens element (610) with negative refractive power, made of plastic, and having a convex object-side surface (611) and a concave image-side surface (612) in proximity to the optical axis, and both object-side surface (611) and image-side surface (612) being aspheric; a second lens element (620) with positive refractive power, made of plastic, and having a convex object-side surface (621) and a convex image-side surface (622) in proximity to the optical axis, and both object-side surface (621) and image-side surface (622) being aspheric; a third lens element (630) with positive refractive power, made of glass, and having a convex object-side surface (631) and a convex image-side surface (632) in proximity to the optical axis, and both object-side surface (631) and image-side surface (632) being aspheric; a fourth lens element (640) with negative refractive power, made of plastic, and having a concave object-side surface (641) and a concave image-side surface (642) in proximity to the optical axis, and both object-side surface (641) and image-side surface (642) being aspheric; a fifth lens element (650) with positive refractive power, made of plastic, and having a convex object-side surface (651) and a concave image-side surface (652) in proximity to the optical axis, and both object-side surface (651) and image-side surface (652) being aspheric; an IR-filter (661) made of glass and a cover-glass (662) made of glass, both being made of panel glass which does not affect the focal length of the image pick-up optical system of the present invention, and sequentially installed between the fifth lens element (650) and an image plane (670); and an image sensor (680) installed on the image plane (670). In this preferred embodiment, the image pick-up optical system further comprises an aperture stop (600) formed between the first lens element (610) and the second lens element (620).

The optical data of the image pick-up optical system of this preferred embodiment are listed in Table 6-1 as follows:

TABLE 6-3

| Relation | Data | Relation | Data |
|---|---|---|---|
| f(mm) | 2.94 | $D_{SR3}/T_{12}$ | 0.11 |
| Fno | 3.00 | $|(R_5 + R_6)/(R_5 - R_6)|$ | 0.21 |
| HFOV | 37.8 | $R_1/R_2$ | 3.02 |
| $f/f_3$ | 1.60 | $|R_4/R_3|$ | 0.21 |
| $f/f_4$ | −1.50 | $R_7/R_8$ | −0.33 |
| $f_2/f_5$ | 1.30 | $|R_9/R_{10}|$ | 0.04 |
| $T_{23}/f$ | 0.02 | $v_3 - v_4$ | 31.8 |
| $CT_1/T_{12}$ | 0.27 | TTL/ImgH | 3.51 |

According to the optical data as shown in Table 6-1 and the aberration curve as shown in FIG. 6B, the image pick-up

TABLE 6-1 f = 2.94 mm, Fno = 3.00, HFOV = 37.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.049762 (ASP) | 0.326 | Plastic | 1.535 | 56.3 | −3.00 |
| 2 | | 1.010999 (ASP) | 1.060 | | | | |
| 3 | Ape. Stop | Plano | 0.128 | | | | |
| 4 | Lens 2 | 23.346058 (ASP) | 0.629 | Plastic | 1.633 | 23.4 | 6.36 |
| 5 | | −4.812962 (ASP) | 0.070 | | | | |
| 6 | Lens 3 | 2.864002 (ASP) | 1.004 | Glass | 1.678 | 55.2 | 1.83 |
| 7 | | −1.882019 (ASP) | 0.117 | | | | |
| 8 | Lens 4 | −1.688805 (ASP) | 0.398 | Plastic | 1.633 | 23.4 | −1.96 |
| 9 | | 5.116719 (ASP) | 0.696 | | | | |
| 10 | Lens 5 | 2.485744 (ASP) | 0.800 | Plastic | 1.530 | 55.8 | 4.88 |
| 11 | | 57.804779 (ASP) | 1.500 | | | | |
| 12 | IR-filter | Plano | 0.300 | Glass | 1.516 | 64.1 | — |
| 13 | | Plano | 0.300 | | | | |
| 14 | Cover-glass | Plano | 0.400 | Glass | 1.516 | 64.1 | — |
| 15 | | Plano | 0.459 | | | | |
| 16 | Image | Plano | — | | | | |

Note:
Reference wavelength is 587.6 nm. ASP stands for aspherical surfaces.

Wherein, the object-side surface and the image-side surface of the first lens element (610) to the fifth lens element (650) comply with the aspheric surface formula as given in Equation (17), and their aspheric coefficients are listed in Table 6-2 as follows:

optical system of in accordance with this preferred embodiment of the present invention provides good correction results in aspects of the longitudinal spherical aberration, astigmatic field curving, and distortion.

TABLE 6-2

Aspheric Coefficients

| Surface # | 1 | 2 | 4 | 5 | 6 |
|---|---|---|---|---|---|
| k = | −2.06969E−01 | −1.23829E+00 | 0.00000E+00 | −1.09684E+01 | −3.33613E−01 |
| A4 = | 3.91374E−03 | 1.57716E−01 | 2.42298E−02 | −6.34729E−03 | 1.34847E−03 |
| A6 = | −7.35595E−03 | −8.54424E−03 | 2.38927E−02 | 3.75036E−03 | −1.74429E−04 |
| A8 = | −2.54300E−03 | 1.78758E−01 | −4.48059E−02 | 5.47458E−03 | −2.14729E−03 |
| A10 = | 1.11018E−03 | −2.57209E−01 | 2.81921E−02 | 2.91167E−03 | |
| A12 = | | 1.30021E−01 | | | |

| Surface # | 7 | 8 | 9 | 10 | 11 |
|---|---|---|---|---|---|
| k = | −3.10628E−01 | −1.21806E+00 | 5.34119E+00 | −4.97037E+00 | −1.00000E+00 |
| A4 = | −1.82845E−03 | 4.87072E−03 | 1.36280E−03 | 2.74505E−02 | 4.89116E−02 |
| A6 = | 4.09629E−03 | −5.55107E−04 | 1.66484E−02 | −2.49321E−03 | 2.06213E−03 |
| A8 = | −3.10081E−05 | 2.47541E−03 | −1.53711E−03 | 6.00684E−04 | −8.69640E−04 |
| A10 = | 2.32027E−04 | 9.81562E−04 | 8.68611E−04 | −1.35884E−04 | −1.06119E−04 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 6-3 as follows:

Seventh Preferred Embodiment

Figure 7A:
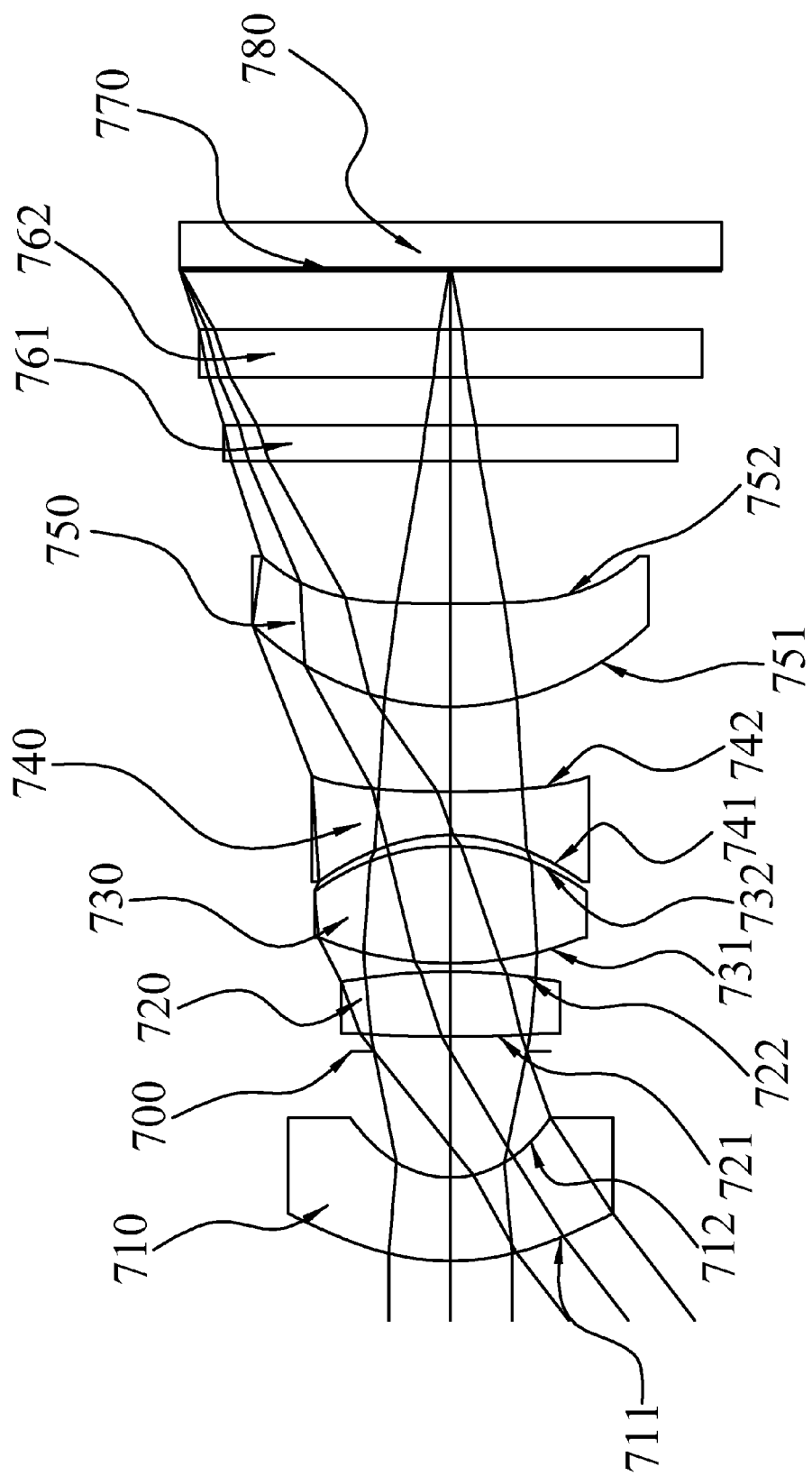
FIG. 7A is a schematic view of an optical system in accordance with the seventh preferred embodiment of the present invention.
Figure 7B:
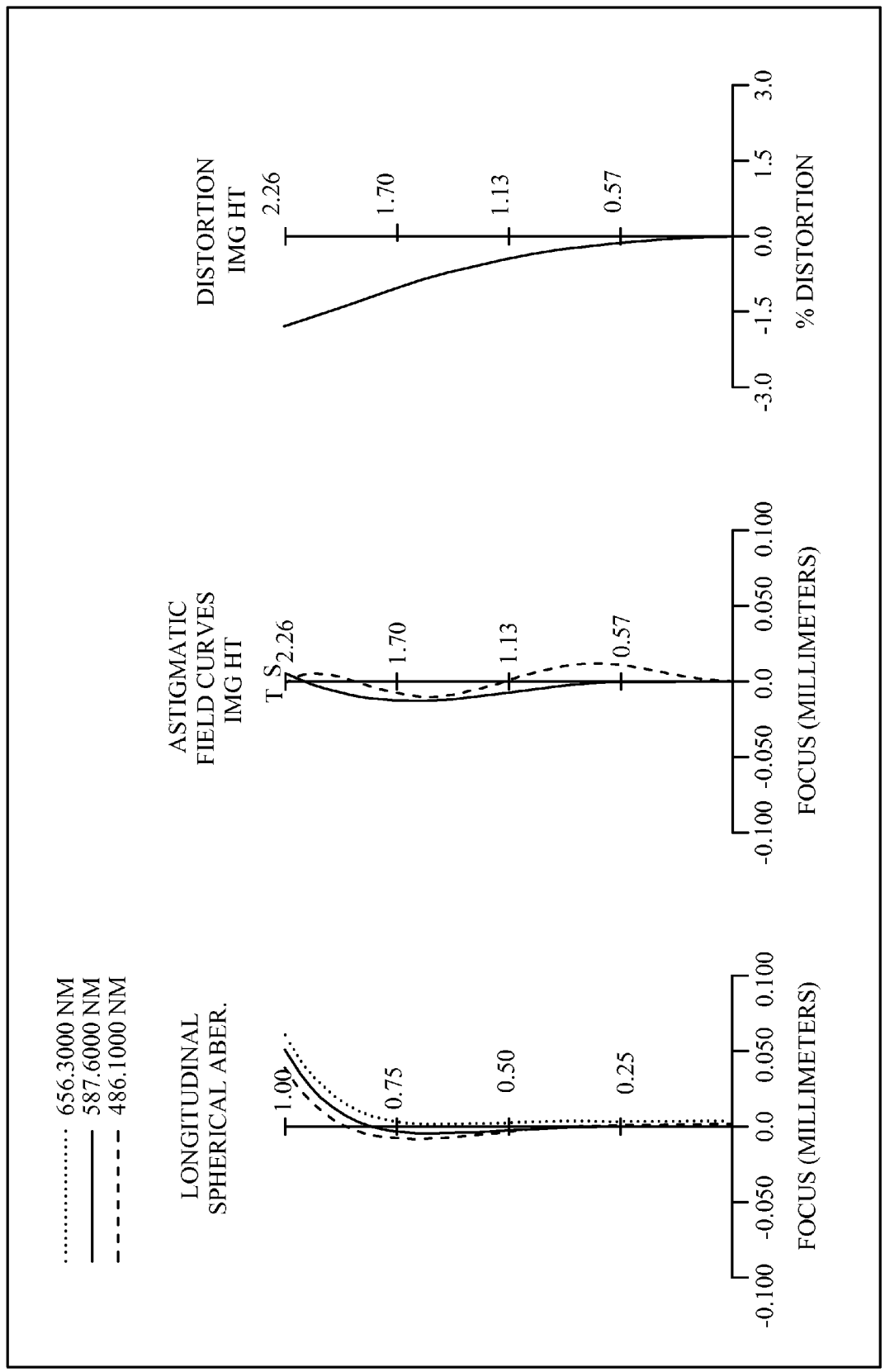
FIG. 7B is a series of aberration curves of the seventh preferred embodiment of the present invention.

With reference to FIGS. 7A and 7B for a schematic view and a series of aberration curves of an image pick-up optical system in accordance with the seventh preferred embodiment of the present invention respectively, the image pick-up optical system comprises five lens elements, an IR-filter (761), a cover-glass (762), an aperture stop (700) and an image sensor (780). The optical system, sequentially arranged from an object side to an image side along an optical axis, comprises: a first lens element (710) with negative refractive power, made of plastic, and having a convex object-side surface (711) and a concave image-side surface (712) in proximity to the optical axis, and both object-side surface (711) and image-side surface (712) being aspheric; a second lens element (720) with positive refractive power, made of plastic, and having a convex object-side surface (721) and a convex image-side surface (722) in proximity to the optical axis, and both object-side surface (721) and image-side surface (722) being aspheric; a third lens element (730) with positive refractive power, made of glass, and having a convex object-side surface (731) and a convex image-side surface (732) in proximity to the optical axis, and both object-side surface (731) and image-side surface (732) being aspheric; a fourth lens element (740) with negative refractive power, made of plastic, and having a concave object-side surface (741) and a concave image-side surface (742) in proximity to the optical axis, and both object-side surface (741) and image-side surface (742) being aspheric; a fifth lens element (750) with positive refractive power, made of plastic, and having a convex object-side surface (751) and a concave image-side surface (752) in proximity to the optical axis, and both object-side surface (751) and image-side surface (752) being aspheric; an IR-filter (761) made of glass and a cover-glass (762) made of glass, both being made of panel glass which does not affect the focal length of the image pick-up optical system of the present invention, and sequentially installed between the fifth lens element (750) and an image plane (770); and an image sensor (780) installed on the image plane (770). In this preferred embodiment, the image pick-up optical system further comprises an aperture stop (700) formed between the first lens element (710) and the second lens element (720).

The optical data of the image pick-up optical system of this preferred embodiment are listed in Table 7-1 as follows:

TABLE 7-1 f = 3.00 mm, Fno = 2.90, HFOV = 37.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.128605 (ASP) | 0.700 | Plastic | 1.535 | 56.3 | −3.27 |
| 2 | | 0.849184 (ASP) | 1.060 | | | | |
| 3 | Ape. Stop | Plano | 0.127 | | | | |
| 4 | Lens 2 | 30.016594 (ASP) | 0.542 | Plastic | 1.633 | 23.4 | 6.34 |
| 5 | | −4.594588 (ASP) | 0.070 | | | | |
| 6 | Lens 3 | 2.989648 (ASP) | 0.983 | Glass | 1.678 | 55.2 | 1.83 |
| 7 | | −1.845280 (ASP) | 0.093 | | | | |
| 8 | Lens 4 | −1.538634 (ASP) | 0.364 | Plastic | 1.633 | 23.4 | −2.03 |
| 9 | | 8.485811 (ASP) | 0.716 | | | | |
| 10 | Lens 5 | 2.200097 (ASP) | 0.864 | Plastic | 1.530 | 55.8 | 4.51 |
| 11 | | 24.006622 (ASP) | 1.200 | | | | |
| 12 | IR-filter | Plano | 0.300 | Glass | 1.516 | 64.1 | — |
| 13 | | Plano | 0.400 | | | | |
| 14 | Cover-glass | Plano | 0.400 | Glass | 1.516 | 64.1 | — |
| 15 | | Plano | 0.506 | | | | |
| 16 | Image | Plano | — | | | | |

Note:
Reference wavelength is 587.6 nm. ASP stands for aspherical surfaces.

Wherein, the object-side surface and the image-side surface of the first lens element (710) to the fifth lens element (750) comply with the aspheric surface formula as given in Equation (17), and their aspheric coefficients are listed in Table 7-2 as follows:

TABLE 7-2

| Aspheric Coefficients | | | | | |
|---|---|---|---|---|---|
| Surface # | 1 | 2 | 4 | 5 | 6 |
| k = | −5.97103E−01 | −1.14363E+00 | 0.00000E+00 | −1.01563E+01 | −1.07704E−01 |
| A4 = | −6.22953E−03 | 1.78331E−01 | 3.75334E−02 | −8.01553E−03 | 1.97041E−03 |
| A6 = | −3.12355E−03 | −4.40017E−02 | −1.62392E−03 | 1.45776E−04 | 3.34474E−03 |
| A8 = | −1.89971E−03 | 2.91929E−01 | 1.37997E−02 | 1.16539E−02 | −2.53235E−03 |
| A10 = | 2.20647E−04 | −3.51358E−01 | −2.54475E−02 | −4.69357E−03 | |
| A12 = | | 1.30021E−01 | | | |
| Surface # | 7 | 8 | 9 | 10 | 11 |
| k = | −3.08481E−01 | −1.25454E+00 | 8.69986E+00 | −4.21906E+00 | −1.00000E+00 |
| A4 = | −3.56945E−03 | 3.11120E−03 | 1.21044E−03 | 3.24297E−02 | 5.77113E−02 |
| A6 = | 4.94327E−03 | −3.69923E−03 | 1.88298E−02 | −2.63725E−03 | 1.80119E−03 |

TABLE 7-2-continued

| Aspheric Coefficients | | | | | |
|---|---|---|---|---|---|
| A8 = | −2.81634E−03 | −6.02411E−05 | 1.06671E−05 | 4.89137E−04 | −1.97523E−03 |
| A10 = | 5.04634E−04 | −1.01199E−03 | −7.90867E−04 | −7.93394E−06 | 3.28925E−04 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 7-3 as follows:

TABLE 7-3

| Relation | Data | Relation | Data |
|---|---|---|---|
| f(mm) | 3.00 | $D_{SR3}/T_{12}$ | 0.11 |
| Fno | 2.90 | $|(R_5 + R_6)/(R_5 − R_6)|$ | 0.24 |
| HFOV | 37.5 | $R_1/R_2$ | 2.51 |
| $f/f_3$ | 1.64 | $|R_4/R_3|$ | 0.15 |
| $f/f_4$ | −1.48 | $R_7/R_8$ | −0.18 |
| $f_2/f_5$ | 1.41 | $|R_9/R_{10}|$ | 0.09 |
| $T_{23}/f$ | 0.02 | $v_3 − v_4$ | 31.8 |
| $CT_1/T_{12}$ | 0.59 | TTL/ImgH | 3.57 |

According to the optical data as shown in Table 7-1 and the aberration curve as shown in FIG. 7B, the image pick-up optical system of in accordance with this preferred embodiment of the present invention provides good correction results in aspects of the longitudinal spherical aberration, astigmatic field curving, and distortion.

Eighth Preferred Embodiment

Figure 8A:
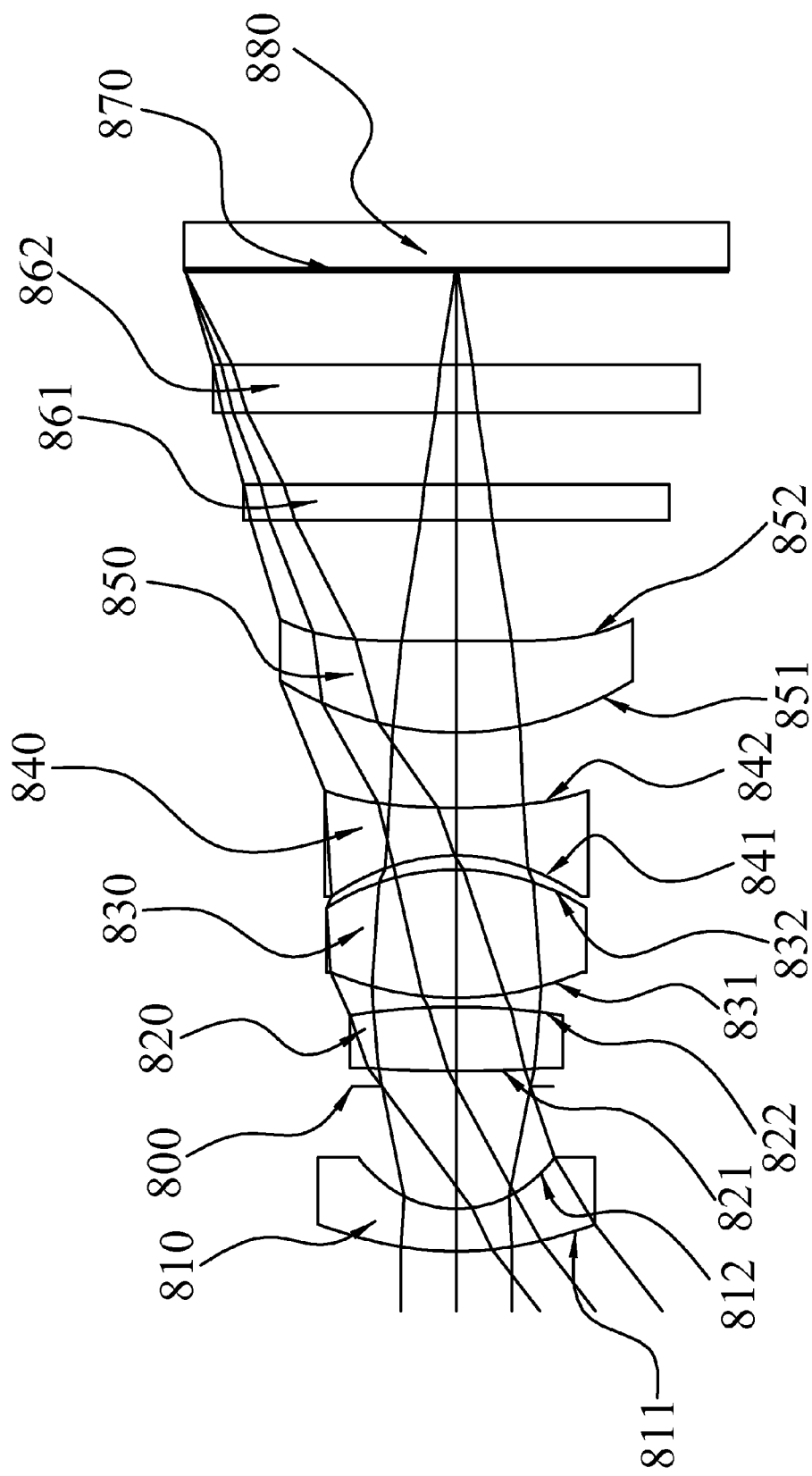
FIG. 8A is a schematic view of an optical system in accordance with the eighth preferred embodiment of the present invention.
Figure 8B:
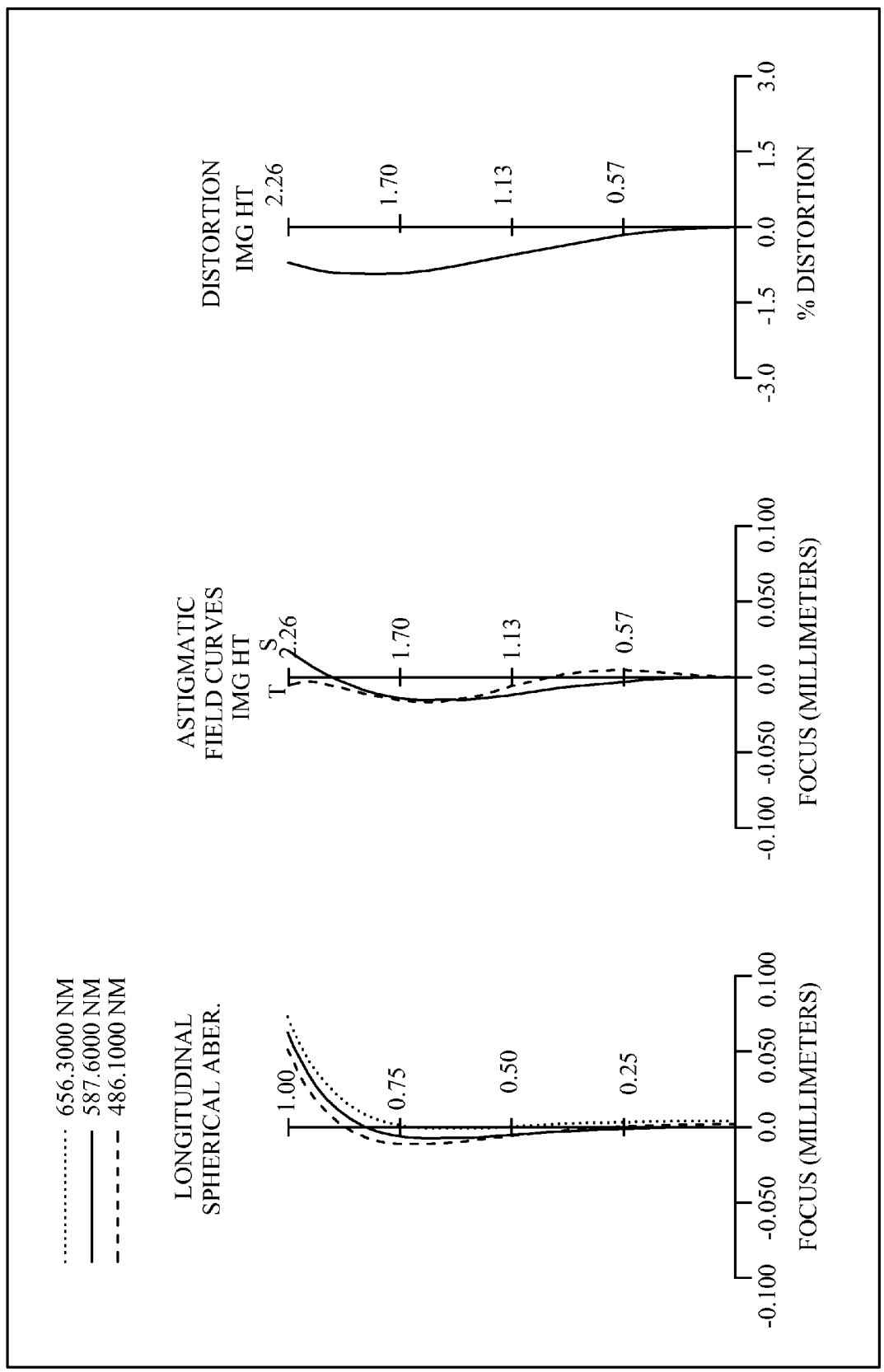
FIG. 8B is a series of aberration curves of the eighth preferred embodiment of the present invention.

With reference to FIGS. 8A and 8B for a schematic view and a series of aberration curves of an image pick-up optical system in accordance with the eighth preferred embodiment of the present invention respectively, the image pick-up optical system comprises five lens elements, an IR-filter (861), a cover-glass (862), an aperture stop (800) and an image sensor (880). The optical system, sequentially arranged from an object side to an image side along an optical axis, comprises: a first lens element (810) with negative refractive power, made of plastic, and having a convex object-side surface (811) and a concave image-side surface (812) in proximity to the optical axis, and both object-side surface (811) and image-side surface (812) being aspheric; a second lens element (820) with positive refractive power, made of plastic, and having a convex object-side surface (821) and a convex image-side surface (822) in proximity to the optical axis, and both object-side surface (821) and image-side surface (822) being aspheric; a third lens element (830) with positive refractive power, made of glass, and having a convex object-side surface (831) and a convex image-side surface (832) in proximity to the optical axis, and both object-side surface (831) and image-side surface (832) being aspheric; a fourth lens element (840) with negative refractive power, made of plastic, and having a concave object-side surface (841) and a concave image-side surface (842) in proximity to the optical axis, and both object-side surface (841) and image-side surface (842) being aspheric; a fifth lens element (850) with positive refractive power, made of plastic, and having a convex object-side surface (851) and a convex image-side surface (852) in proximity to the optical axis, and both object-side surface (851) and image-side surface (852) being aspheric; an IR-filter (861) made of glass and a cover-glass (862) made of glass, both being made of panel glass which does not affect the focal length of the image pick-up optical system of the present invention, and sequentially installed between the fifth lens element (850) and an image plane (870); and an image sensor (880) installed on the image plane (870). In this preferred embodiment, the image pick-up optical system further comprises an aperture stop (800) formed between the first lens element (810) and the second lens element (820).

The optical data of the image pick-up optical system of this preferred embodiment are listed in Table 8-1 as follows:

TABLE 8-1

| f = 2.95 mm, Fno = 3.20, HFOV = 37.7 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 2.820541 (ASP) | 0.353 | Plastic | 1.535 | 56.3 | −2.85 |
| 2 | | 0.947146 (ASP) | 1.018 | | | | |
| 3 | Ape. Stop | Plano | 0.131 | | | | |
| 4 | Lens 2 | 14.450033 (ASP) | 0.534 | Plastic | 1.633 | 23.4 | 6.44 |
| 5 | | −5.590577 (ASP) | 0.077 | | | | |
| 6 | Lens 3 | 2.673688 (ASP) | 1.067 | Glass | 1.678 | 55.2 | 1.85 |
| 7 | | −1.986754 (ASP) | 0.119 | | | | |
| 8 | Lens 4 | −1.618068 (ASP) | 0.397 | Plastic | 1.633 | 23.4 | −1.95 |
| 9 | | 5.720008 (ASP) | 0.628 | | | | |
| 10 | Lens 5 | 2.525736 (ASP) | 0.767 | Plastic | 1.530 | 55.8 | 4.36 |
| 11 | | −24.209402 (ASP) | 1.000 | | | | |
| 12 | IR-filter | Plano | 0.300 | Glass | 1.516 | 64.1 | — |
| 13 | | Plano | 0.600 | | | | |
| 14 | Cover-glass | Plano | 0.400 | Glass | 1.516 | 64.1 | — |
| 15 | | Plano | 0.786 | | | | |
| 16 | Image | Plano | — | | | | |

Note:
Reference wavelength is 587.6 nm. ASP stands for aspherical surfaces.

Wherein, the object-side surface and the image-side surface of the first lens element (810) to the fifth lens element (850) comply with the aspheric surface formula as given in Equation (17), and their aspheric coefficients are listed in Table 8-2 as follows:

TABLE 8-2

Aspheric Coefficients

| Surface # | 1 | 2 | 4 | 5 | 6 |
|---|---|---|---|---|---|
| k = | −1.02743E+00 | −1.17071E+00 | 0.00000E+00 | −1.00006E+01 | 3.35653E−02 |
| A4 = | −2.18346E−04 | 1.54129E−01 | 2.73381E−02 | −7.96653E−03 | 3.63328E−03 |
| A6 = | −5.15389E−03 | −4.15248E−03 | 8.45374E−03 | 4.18244E−03 | 1.73742E−03 |
| A8 = | 1.23118E−03 | 2.13766E−01 | 2.98734E−02 | 1.78839E−02 | −5.03317E−03 |
| A10 = | −5.96436E−04 | −2.67983E−01 | −7.84155E−02 | −2.97213E−02 | |
| A12 = | | 1.30021E−01 | | | |

| Surface # | 7 | 8 | 9 | 10 | 11 |
|---|---|---|---|---|---|
| k = | −2.33931E−01 | −1.10297E+00 | 6.84803E+00 | −5.86084E+00 | −1.00000E+00 |
| A4 = | −4.04899E−03 | 1.98493E−03 | 2.80835E−03 | 2.78935E−02 | 4.70263E−02 |
| A6 = | 3.79021E−03 | −6.00284E−03 | 1.77250E−02 | −2.47399E−03 | 2.88925E−03 |
| A8 = | −2.21949E−03 | 1.05007E−04 | −1.26630E−03 | 5.67226E−04 | −8.41144E−04 |
| A10 = | −1.21860E−03 | −2.98894E−03 | −4.83561E−04 | −1.87051E−04 | −1.98662E−04 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 8-3 as follows:

TABLE 8-3

| Relation | Data | Relation | Data |
|---|---|---|---|
| f(mm) | 2.95 | $D_{SR3}/T_{12}$ | 0.11 |
| Fno | 3.20 | $|(R_5 + R_6)/(R_5 − R_6)|$ | 0.15 |
| HFOV | 37.7 | $R_1/R_2$ | 2.98 |
| $f/f_3$ | 1.59 | $|R_4/R_3|$ | 0.39 |
| $f/f_4$ | −1.51 | $R_7/R_8$ | −0.28 |
| $f_2/f_5$ | 1.48 | $|R_9/R_{10}|$ | 0.10 |
| $T_{23}/f$ | 0.03 | $v_3 − v_4$ | 31.8 |
| $CT_1/T_{12}$ | 0.31 | TTL/ImgH | 3.51 |

According to the optical data as shown in Table 8-1 and the aberration curve as shown in FIG. 8B, the image pick-up optical system of in accordance with this preferred embodiment of the present invention provides good correction results in aspects of the longitudinal spherical aberration, astigmatic field curving, and distortion.

Ninth Preferred Embodiment

Figure 9A:
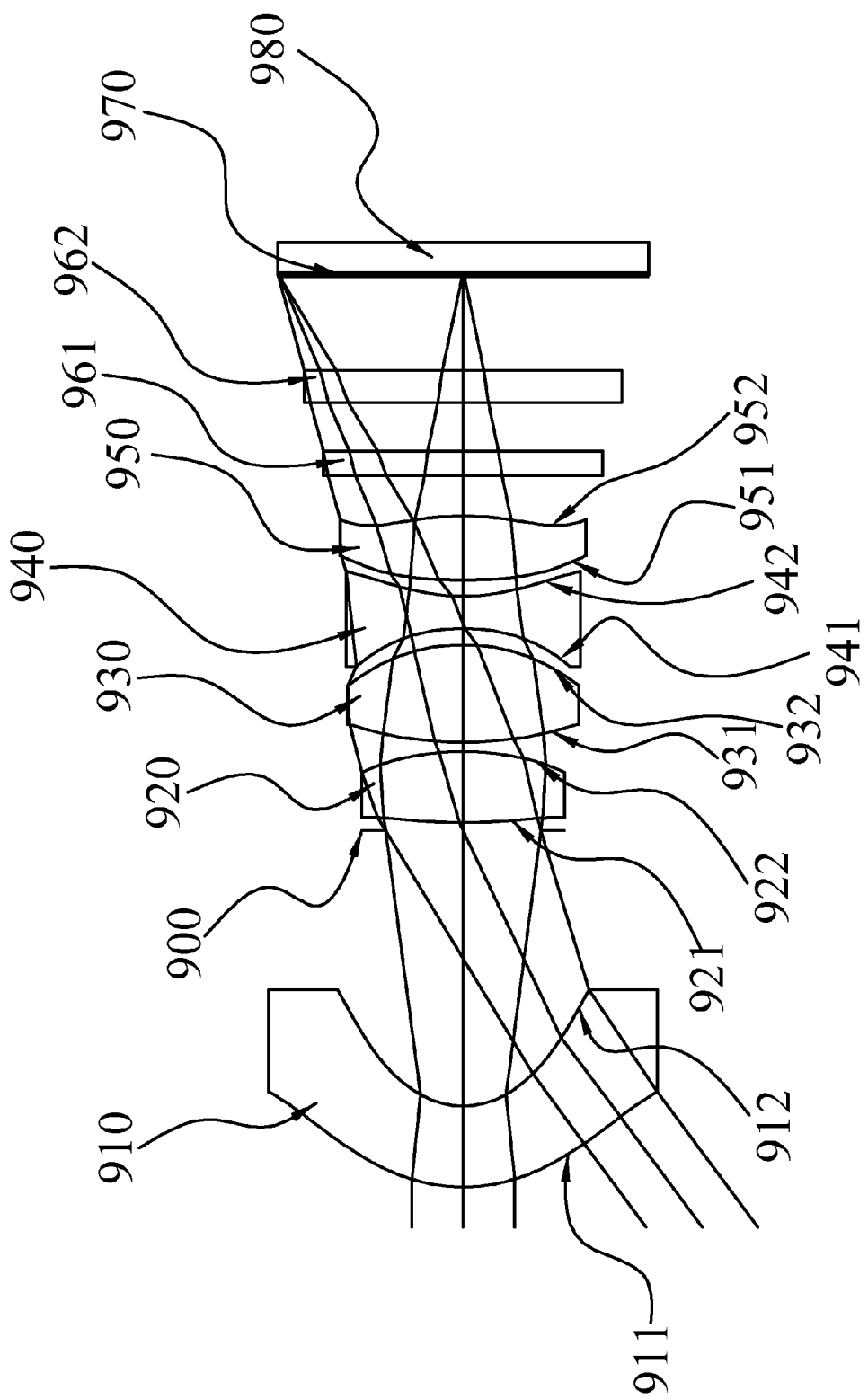
FIG. 9A is a schematic view of an optical system in accordance with the ninth preferred embodiment of the present invention.
Figure 9B:
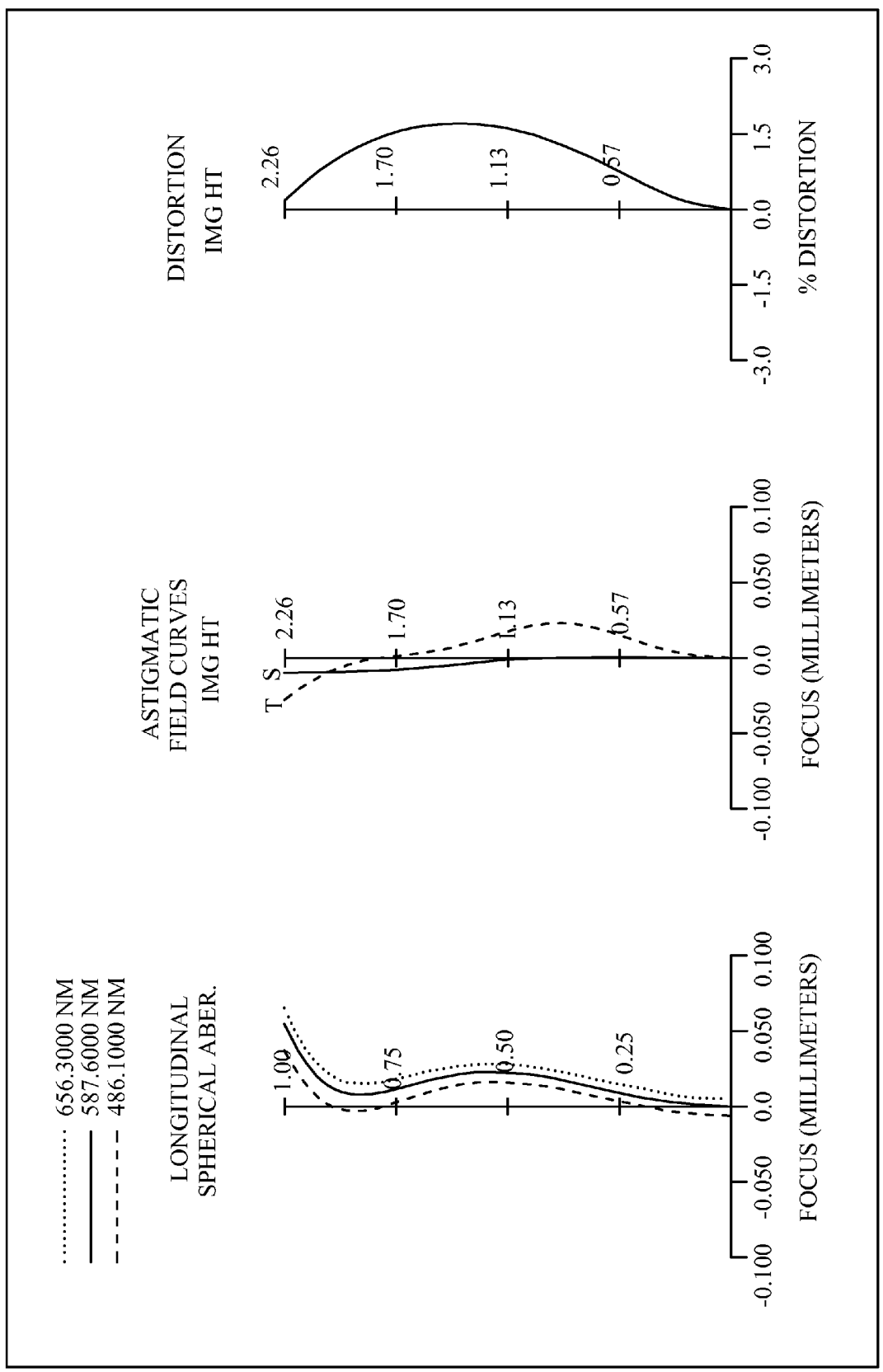
FIG. 9B is a series of aberration curves of the ninth preferred embodiment of the present invention.

With reference to FIGS. 9A and 9B for a schematic view and a series of aberration curves of an image pick-up optical system in accordance with the first preferred embodiment of the present invention respectively, the image pick-up optical system comprises five lens elements, an IR-filter (961), a cover-glass (962), an aperture stop (900) and an image sensor (980). The optical system, sequentially arranged from an object side to an image side along an optical axis, comprises: a first lens element (910) with negative refractive power, made of plastic, and having a convex object-side surface (911) and a concave image-side surface (912) in proximity to the optical axis, and both object-side surface (911) and image-side surface (912) being aspheric; a second lens element (920) with positive refractive power, made of plastic, and having a convex object-side surface (921) and a convex image-side surface (922) in proximity to the optical axis, and both object-side surface (921) and image-side surface (922) being aspheric; a third lens element (930) with positive refractive power, made of glass, and having a convex object-side surface (931) and a convex image-side surface (932) in proximity to the optical axis, and both object-side surface (931) and image-side surface (932) being spheric; a fourth lens element (940) with negative refractive power, made of plastic, and having a concave object-side surface (941) and a concave image-side surface (942) in proximity to the optical axis, and both object-side surface (941) and image-side surface (942) being aspheric, wherein the third lens element (930) and the fourth lens element (940) are cemented into a cemented lens; a fifth lens element (950) with positive refractive power, made of plastic, and having a convex object-side surface (951) and a concave image-side surface (952) in proximity to the optical axis, and both object-side surface (951) and image-side surface (952) being aspheric; an IR-filter (961) made of glass and a cover-glass (962) made of glass, both being made of panel glass which does not affect the focal length of the image pick-up optical system of the present invention, and sequentially installed between the fifth lens element (950) and an image plane (970); and an image sensor (980) installed on the image plane (970). In this preferred embodiment, the image pick-up optical system further comprises an aperture stop (900) formed between the first lens element (910) and the second lens element (920).

The optical data of the image pick-up optical system of this preferred embodiment are listed in Table 9-1 as follows:

TABLE 9-1 f = 3.04 mm, Fno = 2.40, HFOV = 36.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.089559 (ASP) | 1.000 | Plastic | 1.514 | 56.8 | −5.39 |

TABLE 9-1-continued f = 3.04 mm, Fno = 2.40, HFOV = 36.5 deg.

| Surface # | | Curvature Radius | Thickness | Material | Index | Abbe # | Focal Length |
|---|---|---|---|---|---|---|---|
| 2 | | 0.997481 (ASP) | 3.401 | | | | |
| 3 | Ape. Stop | Plano | 0.100 | | | | |
| 4 | Lens 2 | 6.842058 (ASP) | 0.876 | Plastic | 1.535 | 56.3 | 4.35 |
| 5 | | −3.370533 (ASP) | 0.114 | | | | |
| 6 | Lens 3 | 4.607 | 1.207 | Glass | 1.517 | 64.2 | 3.12 |
| 7 | | −2.265 | 0.200 | | | | |
| 8 | Lens 4 | −2.496144 (ASP) | 0.400 | Plastic | 1.583 | 30.2 | −2.06 |
| 9 | | 2.453082 (ASP) | 0.200 | | | | |
| 10 | Lens 5 | 7.847239 (ASP) | 0.791 | Plastic | 1.514 | 56.8 | 4.59 |
| 11 | | −3.251997 (ASP) | 0.500 | | | | |
| 12 | IR-filter | Plano | 0.300 | Glass | 1.516 | 64.1 | — |
| 13 | | Plano | 0.600 | | | | |
| 14 | Cover-glass | Plano | 0.400 | Glass | 1.516 | 64.1 | — |
| 15 | | Plano | 1.178 | | | | |
| 16 | Image | Plano | — | | | | |

Note:
Reference wavelength is 587.6 nm. ASP stands for aspherical surfaces.

Wherein, the object-side surface and the image-side surface of the first lens element (910), second lens element (920), fourth lens element (940) and fifth lens element (950) comply with the aspheric surface formula as given in Equation (17), and their aspheric coefficients are listed in Table 9-2 as follows:

TABLE 9-2

Aspheric Coefficients

| Surface # | 1 | 2 | 4 | 5 |
|---|---|---|---|---|
| k = | −1.14540E+00 | −1.53296E+00 | −7.13555E+00 | −7.97938E+00 |
| A4 = | 6.87551E−03 | 1.19670E−01 | −3.15515E−03 | −1.91365E−02 |
| A6 = | −1.66016E−03 | −1.45736E−02 | −9.18422E−03 | −5.57397E−03 |
| A8 = | −1.18811E−04 | −6.49388E−04 | 6.09842E−03 | 3.78801E−03 |
| A10 = | 1.27525E−05 | 1.67084E−03 | −6.56493E−03 | −2.25409E−03 |
| A12 = | | −6.25764E−04 | | |

| Surface # | 8 | 9 | 10 | 11 |
|---|---|---|---|---|
| k = | 1.84091E+00 | −1.01356E+00 | −4.10610E+01 | −6.76876E+00 |
| A4 = | −2.86244E−02 | −1.95903E−02 | 4.93460E−02 | 1.39819E−02 |
| A6 = | 1.62996E−02 | −3.20674E−03 | −1.86004E−03 | 5.43101E−03 |
| A8 = | −5.90648E−03 | −1.06387E−03 | −1.92828E−03 | 1.00820E−02 |
| A10 = | 3.90288E−03 | 3.05352E−04 | 5.84932E−05 | −2.87325E−03 |

In the image pick-up optical system of this preferred embodiment, the relation of each variable (f, Fno, HFOV, $f_2$, $f_3$, $f_4$, $f_5$, $R_1$, $R_2$, $R_3$, $R_4$, $R_5$, $R_6$, $R_7$, $R_8$, $R_9$, $R_{10}$, $CT_1$, $D_{SR3}$, $T_{12}$, $T_{23}$, $v_3$, $v_4$, TTL and ImgH) is defined above, and thus will not be described here again. Data of related relations are listed in Table 9-3 as follows:

TABLE 9-3

| Relation | Data | Relation | Data |
|---|---|---|---|
| f(mm) | 3.04 | $D_{SR3}/T_{12}$ | 0.03 |
| Fno | 2.40 | $|(R_5 + R_6)/(R_5 − R_6)|$ | 0.34 |
| HFOV | 36.5 | $R_1/R_2$ | 2.09 |
| $f/f_3$ | 0.97 | $|R_4/R_3|$ | 0.49 |
| $f/f_4$ | −1.48 | $R_7/R_8$ | −1.02 |
| $f_2/f_5$ | 0.95 | $|R_9/R_{10}|$ | 2.41 |
| $T_{23}/f$ | 0.04 | $v_3 − v_4$ | 34.00 |
| $CT_1/T_{12}$ | 0.29 | TTL/ImgH | 4.87 |

According to the optical data as shown in Table 9-1 and the aberration curve as shown in FIG. 9B, the image pick-up optical system of in accordance with this preferred embodiment of the present invention provides good correction results in aspects of the longitudinal spherical aberration, astigmatic field curving, and distortion.

In the image pick-up optical system of the present invention, the lens can be made of glass or plastic. If the lens is made of glass, the selection of the refractive power for the thin optical lens assembly can be more flexible. If the lens is made of plastic, the production cost can be reduced effectively. In addition, an aspherical surface is formed on an optical surface of the lens, and the aspherical surface can be easily manufactured into shapes other than those within the limitation of a spherical surface to have more control factors for eliminating aberrations, so as to reduce the number of lenses used and the total length of the optical lens assembly for image photographing of the present invention.

In the image pick-up optical system of the present invention, if the lens surface is convex, the lens surface in proximity to the optical axis is convex; and if the lens surface is concave, the lens surface in proximity to the optical axis is concave.

In the image pick-up optical system of the present invention, at least one stop such as a glare stop or a field stop can be provided for reducing stray lights to improve the image quality.

Tables 1-1 to 9-3 show changes of values of an optical lens assembly for image photographing in accordance with different preferred embodiments of the present invention respectively. However, the changes of values in the preferred embodiments of the present invention are obtained from experiments, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An image pick-up optical system, sequentially from an object side to an image side, comprising:
    a first lens element with negative refractive power, having a convex object-side surface and a concave image-side surface;
    a second lens element with positive refractive power;
    a third lens element with positive refractive power, having a convex object-side surface and a convex image-side surface;
    a fourth lens element with negative refractive power, having a concave object-side surface; and
    a fifth lens element with positive refractive power, made of plastic, and having a convex object-side surface, and at least one of the object-side surface and an image-side surface thereof being aspheric; and
    a stop;
    wherein $f_2$ is a focal length of the second lens element, $f_5$ is a focal length of the fifth lens element, $R_1$ is a radius of curvature of the object-side surface of the first lens element, $R_2$ is a radius of curvature of the image-side surface of the first lens element, $D_{SR3}$ is an axial distance from the stop to the object-side surface of the second lens element, $T_{12}$ is an axial distance between the first lens element and the second lens element, and the following conditions are satisfied:

$0.8 < f_2/f_5 < 1.6$;

$1.2 < R_1/R_2 < 5.0$; and $0 < D_{SR3}/T_{12} < 0.4$.

2. The image pick-up optical system of claim 1, wherein the fourth lens element has a concave image-side surface.

3. The image pick-up optical system of claim 2, wherein $R_7$ is a radius of curvature of the object-side surface of the fourth lens element, $R_8$ is a radius of curvature of the image-side surface of the fourth lens element, and the condition of $-1.1 < R_7/R_8 < 0.0$ is satisfied.

4. The image pick-up optical system of claim 2, further comprising an image sensor, with an image plane for imaging an object, wherein TTL is an axial distance from the object-side surface of the first lens element to the image plane, ImgH is a half of the diagonal length of the effective photosensitive area on the image sensor, and the condition of TTL/ImgH<6.0 is satisfied.

5. The image pick-up optical system of claim 2, wherein the second lens element has a convex image-side surface.

6. The image pick-up optical system of claim 5, wherein $D_{SR3}$ is an axial distance from the stop to the object-side surface of the second lens element, $T_{12}$ is an axial distance between the first lens element and the second lens element, and the condition of $0 D_{SR3}/T_{12} < 0.3$ is satisfied.

7. The image pick-up optical system of claim 6, wherein f is a focal length of the image pick-up optical system, $f_4$ is a focal length of the fourth lens element, and the condition of $-1.8 < f/f_4 < -0.8$ is satisfied.

8. The image pick-up optical system of claim 7, wherein $R_1$ is a radius of curvature of the object-side surface of the first lens element, $R_2$ is a radius of curvature of the image-side surface of the first lens element, and the condition of $1.6 < R_1/R_2 < 3.5$ is satisfied.

9. The image pick-up optical system of claim 7, wherein $R_9$ is a radius of curvature of the object-side surface of the fifth lens element, $R_{10}$ is a radius of curvature of the image-side surface of the fifth lens element, and the condition of $|R_9/R_{10}| < 0.3$ is satisfied.

10. The image pick-up optical system of claim 6, wherein the third lens element is made of glass.

11. The image pick-up optical system of claim 10, wherein the third lens element and the fourth lens element are connected as one doublet lens element.

12. The image pick-up optical system of claim 6, wherein $T_{23}$ is an axial distance between the second lens element and the third lens element, f is a focal length of the image pick-up optical system, and the condition of $0 < T_{23}/f < 0.3$ is satisfied.

13. The image pick-up optical system of claim 12, wherein $D_{SR3}$ is an axial distance from the stop to the object-side surface of the second lens element, $T_{12}$ is an axial distance between the first lens element and the second lens element, and the condition of $0 < D_{SR3}/T_{12} < 0.2$ is satisfied.

14. The image pick-up optical system of claim 5, wherein f is a focal length of the image pick-up optical system, $f_3$ is a focal length of the third lens element, and the condition of $0.8 < f/f_3 < 1.8$ is satisfied.

15. The image pick-up optical system of claim 14, wherein $CT_1$ is a central thickness of the first lens element, $T_{12}$ is an axial distance between the first lens element and the second lens element, and the condition of $0 < CT_1/T_{12} < 0.75$ is satisfied.

16. The image pick-up optical system of claim 14, wherein $R_4$ is a radius of curvature of the image-side surface of the second lens element, $R_3$ is a radius of curvature of the object-side surface the second lens element, and the condition of $|R_4/R_3| < 0.6$ is satisfied.

17. The image pick-up optical system of claim 5, wherein $R_5$ is a radius of curvature of the object-side surface of the third lens element, $R_6$ is a radius of curvature of the image-side surface of the third lens element, and the condition of $|R_5+R_6)/(R_5-R_6)| < 0.5$ is satisfied.

18. The image pick-up optical system of claim 1, wherein $v_3$ is an Abbe number of the third lens element, $v_4$ is an Abbe number of the fourth lens element, and the condition of $23.0 < v_3 - v_4 < 38.0$ is satisfied.

* * * * *

UNITED STATES PATENT AND TRADEMARK OFFICE
CERTIFICATE OF CORRECTION

PATENT NO. : 8,395,853 B2
APPLICATION NO. : 13/210028
DATED : March 12, 2013
INVENTOR(S) : Chun-Shan Chen, Ming-Ta Chou and Hsin-Hsuan Huang It is certified that error appears in the above-identified patent and that said Letters Patent is hereby corrected as shown below:

In the Specification

Eq. 3, "$0 < D_{SR3}/T_{12} < 0.4$" should be "$0 \leq D_{SR3}/T_{12} < 0.4$" in column 2, line 29.

Eq. 7, "$0 < D_{SR3}/T_{12} < 0.3$" should be "$0 \leq D_{SR3}/T_{12} < 0.3$" in column 3, line 18; column 4, line 6; and column 7, line 29.

Eq. 11, "$0 < D_{SR3}/T_{12} < 0.2$" should be "$0 \leq D_{SR3}/T_{12} < 0.2$" in column 3, line 26; and column 7, line 30.

Eq. 13, "$-0.8 < f/f_3 < -1.8$'" should be "$0.8 < f/f_3 < -1.8$" in column 4, line 8.

In the Claims

Eq. 3, "$0 < D_{SR3}/T_{12} < 0.4$" should be "$0 \leq D_{SR3}/T_{12} < 0.4$" in claim 1, last line.

Eq. 7, "$0 < D_{SR3}/T_{12} < 0.3$" should be "$0 \leq D_{SR3}/T_{12} < 0.3$" in claim 6, line 5.

Eq. 11, "$0 < D_{SR3}/T_{12} < 0.2$" should be "$0 \leq D_{SR3}/T_{12} < 0.2$" in claim 13, line 33.

Signed and Sealed this
Ninth Day of July, 2013

Teresa Stanek Rea
*Acting Director of the United States Patent and Trademark Office*